United States Patent
Wechsler et al.

(10) Patent No.: US 8,379,940 B2
(45) Date of Patent: Feb. 19, 2013

(54) ROBUST HUMAN AUTHENTICATION USING HOLISTIC ANTHROPOMETRIC AND APPEARANCE-BASED FEATURES AND BOOSTING

(75) Inventors: Harry Wechsler, Fairfax, VA (US); Venkatesh Ramanathan, Herndon, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 462 days.

(21) Appl. No.: 12/791,152

(22) Filed: Jun. 1, 2010

(65) Prior Publication Data
US 2011/0135165 A1   Jun. 9, 2011

Related U.S. Application Data

(60) Provisional application No. 61/183,103, filed on Jun. 2, 2009.

(51) Int. Cl.
*G06K 9/00* (2006.01)
(52) U.S. Cl. .................................................. 382/118
(58) Field of Classification Search ........................ None
See application file for complete search history.

(56) References Cited

U.S. PATENT DOCUMENTS

| | | | | |
|---|---|---|---|---|
| 5,850,470 | A * | 12/1998 | Kung et al. | 382/157 |
| 7,492,943 | B2 * | 2/2009 | Li et al. | 382/159 |
| 2003/0169906 | A1 * | 9/2003 | Gokturk et al. | 382/115 |
| 2009/0196510 | A1 * | 8/2009 | Gokturk et al. | 382/224 |
| 2010/0191541 | A1 * | 7/2010 | Prokoski | 705/2 |

* cited by examiner

*Primary Examiner* — Vikkram Bali
(74) *Attorney, Agent, or Firm* — David Yee

(57) ABSTRACT

A new robust human authentication system, device, and instructions, embeddable in a physical and tangible computer readable medium, for determining if at least one test image obtained using an imaging device matches at least one training image in an enrollment database, are disclosed. This invention applies the concepts of appearance (PCA or PCA+ LDA) and holistic anthropometrics that include head, face, neck, and shoulder linear and non-linear geometric measurements. The appearance ("eigen") coefficients and holistic anthropometric measurements selected may be used as feature vectors. A boosting algorithm ranks features as "weak learners" and combines their outputs for "strong" recognition.

20 Claims, 14 Drawing Sheets

ROBUST HUMAN AUTHENTICATION USING HOLISTIC ANTHROPOMETRIC AND APPEARANCE-BASED FEATURES AND BOOSTING

CROSS-REFERENCE TO RELATED APPLICATIONS

This present application claims the benefit of provisional patent application Ser. No. 61/183,103 to Wechsler et al., filed on Jun. 2, 2009, entitled "Robust Face Recognition or Occlusion and Disguise Using Holistic Anthropometric and Appearance-Based Features and Boosting," which is hereby incorporated by reference.

BACKGROUND OF THE INVENTION

The present invention relates to field of human authentication systems. More specifically, the present invention utilizes a new way to robustly authenticate humans. Throughout the present invention, the term "robust" means the present invention's ability to handle test images that may have been altered. Alteration can be either occlusion (meaning incomplete) or disguised (meaning corrupt).

Understanding how people process and recognize each other's face and developing robust human authentication systems still remain a grand challenge for computational intelligence, in general, and computer vision, in particular. The human authentication challenge belongs to biometrics, the science of authenticating people from measuring their physical or external appearance. In addition to security and surveillance, the ability to recognize living creatures has also become a critical enabling technology for a wide range of applications that includes defense, health care, human-computer interaction, image retrieval and data mining, industrial and personal robotics, and transportation.

Face recognition is largely motivated by the need for surveillance and security, telecommunication and digital libraries, human-computer intelligent interaction, and smart environments. Some of these security uses may include log in control and physical access control. Additional applications may include law enforcement purposes, such as mug shot albums, criminology, and commercial transactions that involve the use of credit cards, driver's licenses, passports, or other photo identifications. Virtually all applications that depend upon the identification of a person could benefit from this technology.

The solutions suggested so far are synergetic efforts from fields, such as signal and image processing, pattern recognition, machine learning, neural networks, statistics, evolutionary computation, psychophysics of human perception and neurosciences, and system engineering. A generic approach often used involves statistical estimation and the learning of face class statistics for subsequent face detection and classification. Face detection generally applies a statistical characterization of faces and non-faces to build a classifier, which may then be used to search over different locations and scales for image patterns that are likely to be human faces.

Face recognition usually employs various statistical techniques to derive appearance-based models for classification. Some of these techniques include, but are not limited to, Principal Component Analysis (hereinafter referred to as PCA); Fisher Linear Discriminant (hereinafter referred to as FLD), which is also known as Linear Discriminant Analysis (hereinafter referred to as LDA); Independent Component Analysis (hereinafter referred to as ICA); Local Feature Analysis (hereinafter referred to as LFA); and Gabor and bunch graphs. Descriptions of PCA may be found in: [M. Turk and A. Pentland, "Eigenfaces for Recognition," 13 J. Cognitive Neurosci, 71-86 (1990)], and [B. Moghaddam and A. Pentland, "Probabilistic Visual Learning for Object Representation," 19 IEEE Trans. Pattern Analysis and Machine Intel. 696-710 (1997)]. Descriptions of FLD and LDA may be found in: [D. L. Swets and J. Weng, "Using Discriminant Eigenfeatures for Image Retrieval," 18 IEEE Trans. Pattern Analysis and Machine Intel 831-36 (1996)]; [P. N. Belhumeur et al., "Eigenfaces vs. Fisherfaces: Recognition Using Class Specific Linear Projection," 19 IEEE Trans. Pattern Analysis and Machine Intel 711-20 (1997)], and [K. Etemad and R. Chellappa, "Discriminant Analysis for Recognition of Human Face Images," 14 J. Opt. Soc. Am. A 1724-33 (1997)]. A description of ICA may be found in: [G. Donato et al., "Classifying Facial Actions," 21 IEEE Trans. Pattern Analysis and Machine Intel 974-89 (1999)]. LFA is described in: [P. S. Penev and J. J. Atick, "Local Feature Analysis: A General Statistical Theory for Object Representation," 7 Network: Computation in Neural Sys. 477-500 (1996).]

Face recognition may depend heavily on the particular choice of features used by the classifier. One usually starts with a given set of features and then attempts to derive an optimal subset (under some criteria) of features leading to high classification performance with the expectation that similar performance may be also displayed on future trials using novel (unseen) test data. PCA is a popular technique used to derive a starting set of features for both face representation and recognition. Kirby and Sirovich showed that any particular face may be (i) economically represented along the eigenpictures coordinate space, and (ii) approximately reconstructed using just a small collection of eigenpictures and their corresponding projections ('coefficients'). [M. Kirby and L. Sirovich, "Application of the Karhunen-Loeve Procedure for the Characterization of Human Faces," 12 IEEE Trans. Pattern Analysis and Machine Intel 103-08 (1990)].

Applying the PCA technique to face recognition, Turk and Pentland developed a well-known eigenface method that sparked an explosion of interests in applying statistical techniques to face recognition. However, PCA, an optimal representation criterion (in the sense of mean square error), does not consider the classification aspect. One solution for taking into account and improving the classification performance is to combine PCA, the optimal representation criterion, with the Bayes classifier, the optimal classification criterion (when the density functions are given). Toward that end, Moghaddam and Pentland developed a probabilistic visual learning method, which uses the eigenspace decomposition as an integral part of estimating complete density functions in high-dimensional image space. While the leading eigenvalues are derived directly by PCA, the remainder of the eigenvalue spectrum is estimated by curve fitting.

Rather than estimating the densities in high-dimensional space, Liu and Wechsler developed a PRM (Probabilistic Reasoning Model) method by first applying PCA for dimensionality reduction and then applying the Bayes classifier and the MAP rule for classification. [C. Liu and H. Wechsler, "Robust Coding Schemes for Indexing and Retrieval from Large Face Databases," 9 IEEE Trans. Image Processing 132-37 (2000)]. The rationale of the PRM method is that of lowering the space dimension subject to increased fitness for the discrimination index by estimating the conditional density function of each class using the within-class scatter in the reduced PCA space.

Another important statistical technique widely used in face recognition is the FLD (or LDA), which models both the within- and the between-class scatters. FLD, which is behind several face recognition methods, induces non-orthogonal projection bases, a characteristic known to have great functional significance in biological sensory systems [J. G. Daugman, "An Information-Theoretic View of Analog Representation in Striate Cortex," Computational Neuroscience 403-24 (MIT Press 1990)]. As the original image space is highly dimensional, most face recognition methods perform first dimensionality reduction using PCA, as it is the case with the Fisherfaces method suggested by Belhumeur et al. Swets and Weng have pointed out that the eigenfaces method derives only the Most Expressive Features (MEF) and that PCA inspired features do not necessarily provide for good discrimination. As a consequence, the subsequent FLD projections are used to build the Most Discriminating Features (MDF) classification space. The MDF space is, however, superior to the MEF space for face recognition only when the training images are representative of the range of face (class) variations. Otherwise, the performance difference between the MEF and MDF is not significant.

The drawback of FLD is that it requires large sample sizes for good generalization. For a face recognition problem, however, usually there are a large number of faces (classes), but only a few training examples per face. One possible remedy for this drawback, according to Etemad and Chellappa, is to artificially generate additional data and thus increase the sample size. Yet another remedy, according to Liu and Wechsler, is to improve FLD's generalization performance by balancing the need for adequate signal representation and subsequent classification performance using sensitivity analysis on the spectral range of the within-class eigenvalues.

Other developments, which are conceptually relevant to the face recognition community in general, include LFA, and the related Dynamic Link Architecture (hereinafter referred to as DLA) [M. Lades et al., "Distortion Invariant Object Recognition in the Dynamic Link Architecture," 42 IEEE Trans. Computers 300-11 (1993)], and elastic graph matching methods [L. Wiskott et al., "Face Recognition by Elastic Bunch Graph Matching," 19 IEEE Trans. Pattern Analysis and Machine Intel 775-79 (1997)]. LFA uses a sparse version of the PCA transform, followed by a discriminative network. DLA starts by computing Gabor jets, and then it performs a flexible template comparison between the resulting image decompositions using graph-matching.

While each of these techniques aid in face recognition, there still remains the problem of occlusion and disguise. Thus, what is needed is a robust face recognition system that can address these problems efficiently and economically, particularly for human authentication.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Embodiments of the present invention address the problem of developing robust facial recognition systems despite occlusion and disguise, which correspond to missing and altered face components, respectively. Much of this disclosure discusses the embodiments with respect to human authentication. A new robust human authentication system, device, and method embedded in a physical and tangible computer readable medium are introduced that may be used to aid recognition.

As a robust human authentication system, it is a physical architecture with each component of the architecture being a physical module. An example of the system can be a machine that comprises a multitude of machines or modules with specific, individual responsibilities that can communicate with one another. The robust human authentication system determines if at least one test image obtained using an imaging device (e.g., camera, video, recorder, etc.) matches at least one training image in an enrollment database. The enrollment database serves as a gallery filled with a multitude of training images, which may be used for comparison, matching, and authentication purposes.

Like the system, the present invention can be a device (e.g., a handheld device for identifying an individual, etc.). The present invention can also be a physical and tangible computer readable medium (e.g., computer program product, etc.) with instructions for determining if at least one test image obtained using an imaging device (e.g., camera, video, recorder, etc.) matches at least one training image in an enrollment database.

The following meanings are within the scope of the present invention. Robust means the present invention's ability to handle test images that may have been altered. Alteration can be either occlusion (meaning incomplete) or disguised (meaning corrupt). The test image and training image are a human. Human expands on the traditional face (only) by including all the holistic measures, such as head, face, neck, and/or shoulders.

Figure 1:
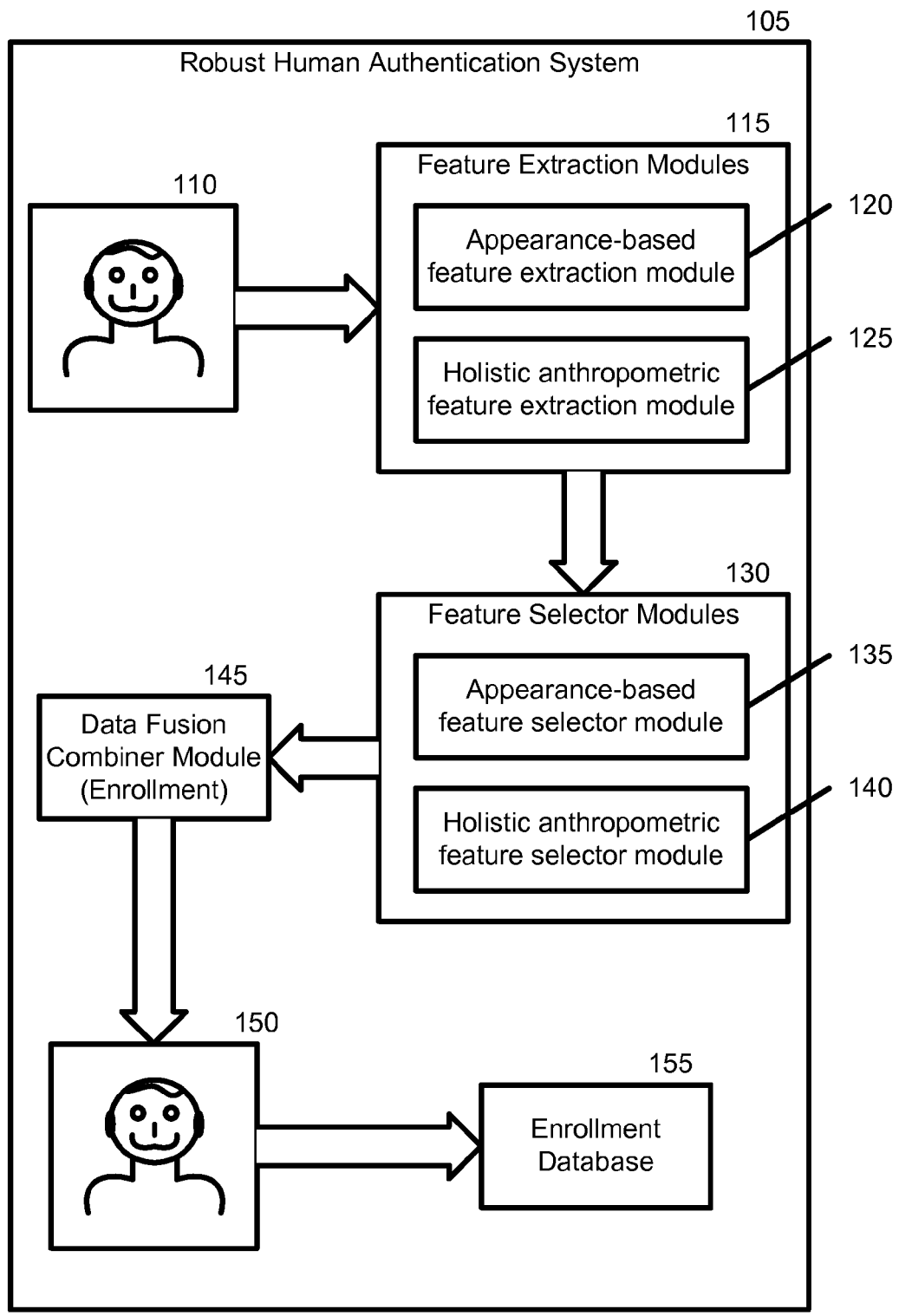
FIG. 1 is a block diagram showing a robust human authentication system.
Figure 2:
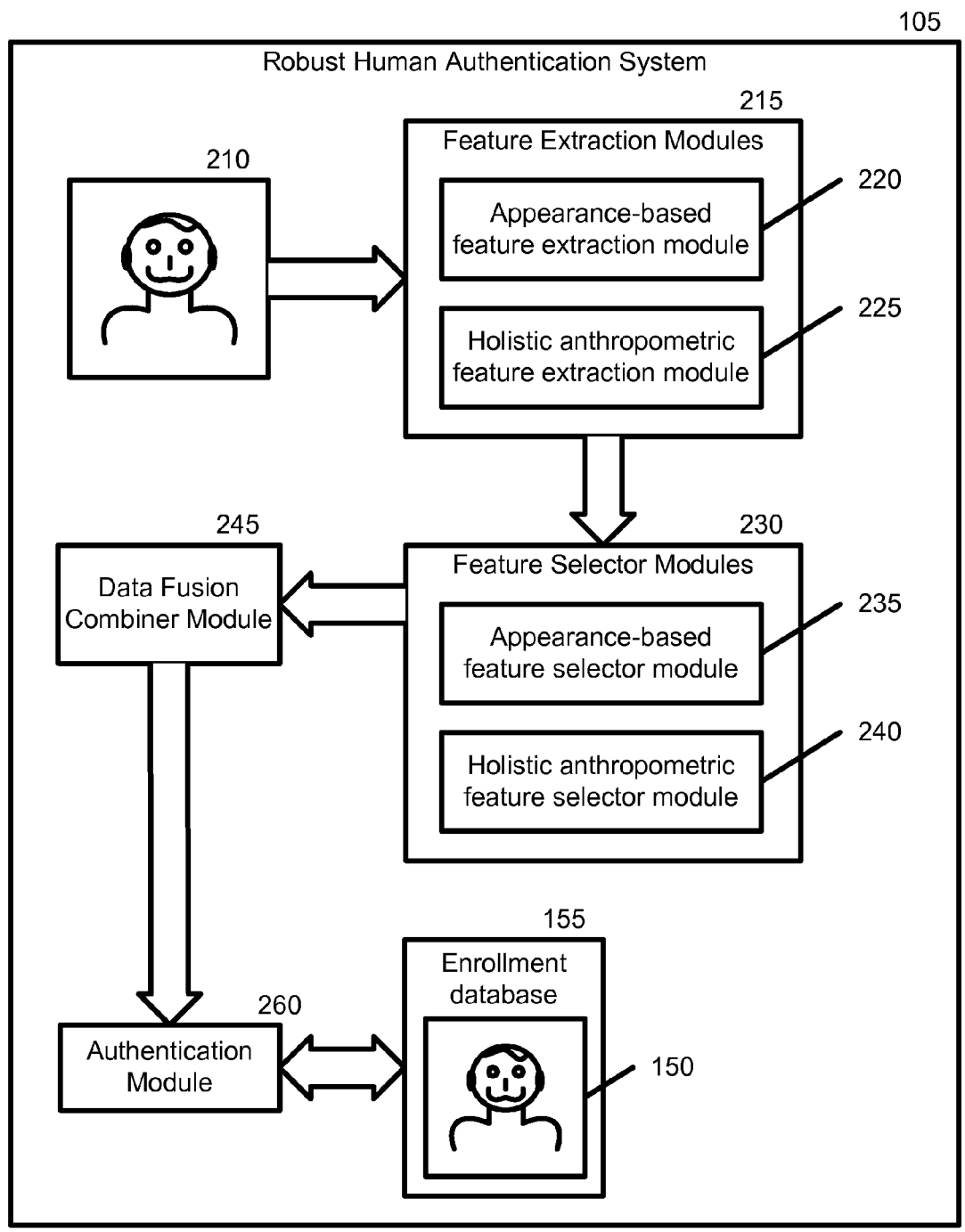
FIG. 2 is a block diagram showing another aspect of a robust human authentication system.
Figure 3:
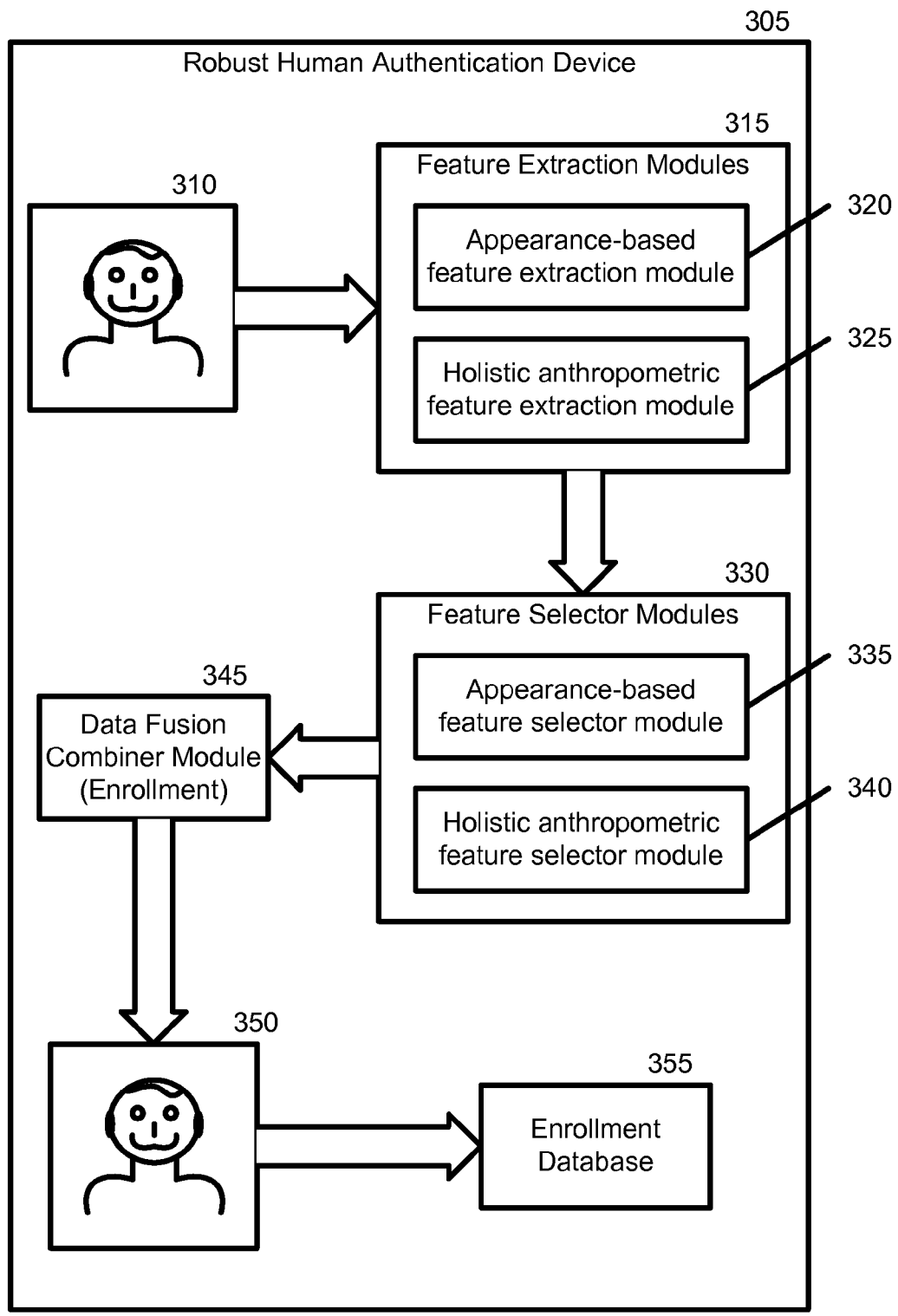
FIG. 3 is a block diagram showing a robust human authentication device.
Figure 4:
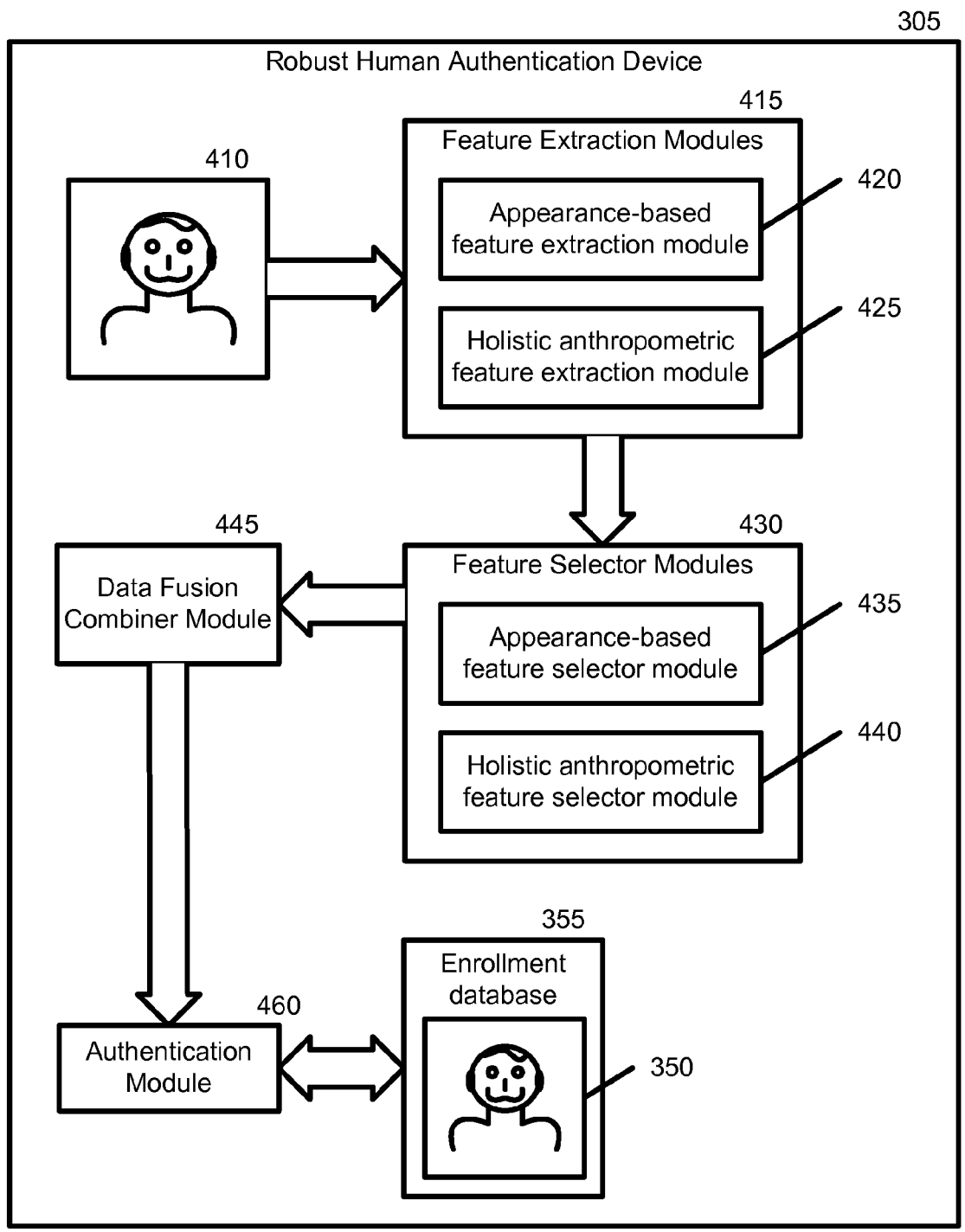
FIG. 4 is a block diagram showing another aspect of a robust human authentication device.

Referring to FIGS. 1-2, the present invention as a robust human authentication system (physical architecture) 105 may comprise feature extraction modules 115, 215, feature selector modules 130, 230, and at least one data fusion combiner module 145. Likewise, referring to FIGS. 3-4, the present invention as a robust human authentication device 305 may comprise feature extraction modules 315, 415, feature selector modules 330, 430, and at least one data fusion combiner module 345. Both the system 105 and device 305 can determine if at least one test image 210, 410 obtained using an imaging device matches at least one training image 150, 350 in an enrollment database 155, 355.

Feature extractor modules 115, 215, 315, 415 may comprise at least one appearance-based feature extraction module 120, 220, 320, 420 and at least one holistic anthropometric feature extraction module 125, 225, 325, 425. The appearance-based feature extraction module 120, 220, 320, 420 may be configured for extracting appearance-based features. Appearance-based features may come from the face of the test image 210, 410.

The holistic anthropometric feature extraction module 125, 225, 325, 425 may be configured for extracting holistic anthropometric features (e.g., pairwise measurements) of the head, face, neck, and/or shoulders of the test image 210, 410.

Feature selector modules 130, 230, 330, 430 may comprise at least one appearance-based feature selector module 135, 235, 335, 435 and at least one holistic anthropometric feature selector module 140, 240, 340, 440. The appearance-based feature selector module 135, 235, 335, 435 may be configured for using energy-based cut-off criteria to select those appearance-based features that have been extracted. The holistic anthropometric feature selector 140, 240, 340, 440 may be configured for selecting the extracted holistic anthropometric features that are the predictive of the identification of the test image 210, 410 (e.g., most informative measurements of the head, face, neck, and/or at least one shoulder).

The holistic anthropometric feature selector module 140, 240, 340, 440 may use a filter-based feature selection approach. The filter-based selection approach may be driven by the mutual information between the test image's data and the test image's label. The filter-based feature selection approach may be implemented by correlation-based feature selection.

The data fusion combiner module 145, 345 may be a decision-level neural network combiner module. The decision-level neural network combiner module can be configured for combining the appearance-based features with the holistic anthropometric features using neural networks.

Alternatively, the data fusion combiner module 145, 245, 345, 445 may be a feature-level boosting combiner module. The feature-level boosting combiner module can be configured for combining the appearance-based features with the holistic anthropometric features using boosting. It is often the case where the feature-level boosting combiner module performs better than the decision-level neural network combiner module, and thus can be deemed as the best.

Where the combined features are those of a training image 110, 310, they may be enrolled in an enrollment database 155, 355. Where the combined features are those of a test image 210, 410, they are to be compared, matched, and authenticated against the training images 150, 350 in the enrollment database. To accomplish this latter aspect, the present invention can further include an authentication module 260, 460. The authentication module 260, 460 can be configured for matching and authenticating the results of the combined features from the data fusion combiner with the training image 150, 350. It should be noted that the present invention allows any image, whether a training image or a test image, can be enrolled in the enrollment database. Results can be displayed in the authentication module 260, 460 or in a separate module, such as a result module or an audio/video graphics apparatus (e.g., a monitor, tablet, touch screen display, etc.).

The present invention can also further include a training image preprocessor module. The training image preprocessor module can be configured for preprocessing at least one training image by: converting 256 gray levels into floating points; using geometric normalization that lines up chosen eye coordinates; cropping the training image using an elliptical mask; equalizing a histogram of the training image; and normalizing pixel values to mean zero and variance of one.

It is should be noted that the number of gray levels need not be 256. It can be 64, 128, etc.

The same training image preprocessor module can also be configured for preprocessing at least one test image. Alternatively, the present invention may further include a test image preprocessor module configured for preprocessing at least one test image.

Besides being a physical architecture, the present invention can also be implemented as a physical and tangible computer readable medium 505. The physical and tangible computer readable medium 505 may be encoded with instructions for robustly authenticating humans. Capable of being transferred and stored into the memory of a computer, computer processor or hard drive, these instructions robustly determines if at least one test image obtained using an imaging device (e.g., camera, video, recorder, etc.) matches at least one training image.

Examples of physical and tangible computer readable mediums include, but are not limited to, a compact disc (cd), digital versatile disc (dvd), usb flash drive, floppy disk, random access memory (RAM), read-only memory (ROM), erasable programmable read-only memory (EPROM), optical fiber, etc. It should be noted that the tangible computer readable medium may even be any suitable medium in which the instructions can be electronically captured, such as optical scanning. Where optical scanning occurs, the instructions may be compiled, interpreted, or otherwise processed in a suitable manner, if necessary, and then stored in computer memory.

The instructions may be written using any computer language or format. Nonlimiting examples of computer languages include Ada, Ajax, C++, Cobol, Java, Python, XML, etc.

The instruction execution system may be any apparatus (such as a computer or processor) or "other device" that is configured or configurable to execute embedded instructions. Examples of "other device" include, but are not limited to, PDA, cd player/drive, dvd player/drive, cell phone, etc.

Figure 5:
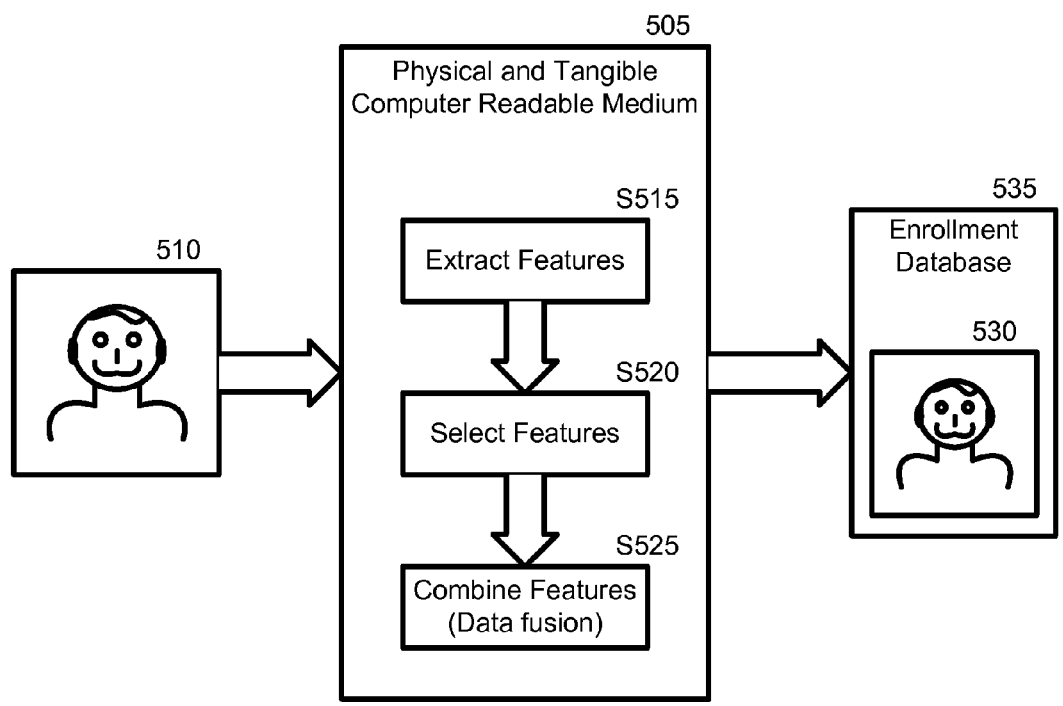
FIG. 5 is a block diagram showing a physical and tangible computer readable medium with instructions for robust human authentication.
Figure 6:
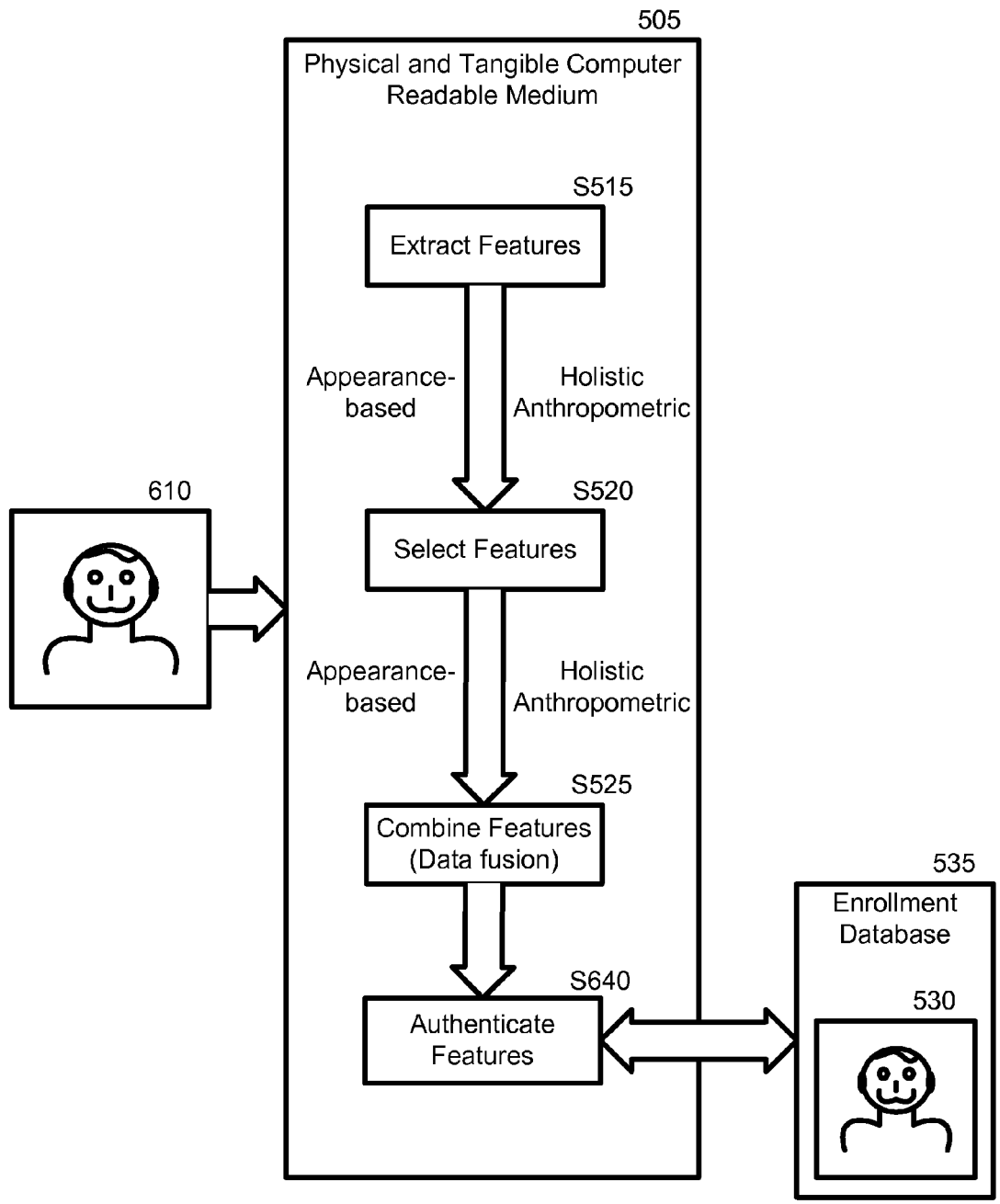
FIG. 6 is a block diagram showing another aspect of a physical and tangible computer readable medium with instructions for robust human authentication.

As illustrated in FIGS. 5-6, upon execution of the instructions, one or more processors may extract features S515, select features S520, and combine the features S525.

The following features may be extracted. Appearance-based features from the face of the test image may be extracted. Holistic anthropometric features (e.g., pairwise measurements) of the head, face, neck, and/or shoulders of the test image may be extracted.

Extracted appearance-based features may be selected using energy-based cut-off criteria. Extracted holistic anthropometric features that are the predictive of the identification of the test image (e.g., most informative measurements of the head, face, neck, and/or at least one shoulder) may also be selected.

When selecting extracted, holistic anthropometric features, the present invention may use a filter-based feature selection approach. The filter-based selection approach may be driven by the mutual information between the test image's data and the test image's label. The filter-based feature selection approach may be implemented by correlation-based feature selection.

The data selected may then be combined. In one embodiment, decision-level neural network is used. In this approach, the appearance-based features may be combined with the holistic anthropometric features using neural networks.

Alternatively, the data selected may be combined using feature-level boosting. In this approach, the appearance-based features may be combined with the holistic anthropometric features using boosting. It is often the case where the feature-level boosting performs better than the decision-level neural network, and thus can be deemed as the best.

Where the combined features are those of a training image 510, they 530 may be enrolled in an enrollment database 535. Where the combined features are those of a test image 610, they are to be compared, matched, and authenticated against the training images 530 in the enrollment database 535. To accomplish this latter aspect, the present invention can further include instructions for matching and authenticating the results of the combined features (of the test image 610) S640 with the training image 530. It should be noted that the present invention allows any image, whether a training image or a test image, can be enrolled in the enrollment database. Results can be displayed. The display may be a result module or an audio/video graphics apparatus (e.g., a monitor, tablet, touch screen display, etc.).

Furthermore, the physical and tangible computer readable medium can also include instructions for preprocessing at least one training image. Preprocessing may include: converting 256 gray levels into floating points; using geometric normalization that lines up chosen eye coordinates; cropping the training image using an elliptical mask; equalizing a histogram of the training image; and normalizing pixel values to mean zero and variance of one. Like above, it is should be noted that the number of gray levels need not be 256. It can be 64, 128, etc.

The present invention can also further include instructions for preprocessing at least one test image. Only this time, the preprocessing described above involves a test image instead of a training image.

I. Introduction

Overall, the present invention combines appearance-based recognition (PCA or PCA+LDA "Fisherfaces") and holistic anthropometric-based recognition, with the latter including Head (H) and Shoulder (S), in addition to Face (F), linear and non-linear geometric measurements.

The first stage deals with feature selection. PCA/PCA+LDA employs an energy based cut-off criteria to select top ranked eigenfaces or Fisherfaces. Anthropometric features may be chosen using a correlation based feature selection algorithm.

The second stage deals with optimization. In general, this stage uses boosting to optimally combining best appearance-based and anthropometric-based features.

Experiments may be carried out to evaluate recognition performance, namely, i) stand alone PCA/PCA+LDA, ii) decision level fusion that utilizes PCA or PCA+LDA augmented by anthropometric features, and iii) a boosting algorithm that employs feature level fusion of PCA/PCA+LDA and anthropometric measurements for both occluded and disguised images.

Experimental results indicate advantages of the hybrid (appearance-based and holistic anthropometric) boosting method. In particular, the hybrid has outperformed (1) stand alone PCA and PCA+LDA; and (2) PCA or PCA+LDA augmented by only anthropometric face features for both occluded and disguised images. The emphasis throughout includes, but is not limited to, feature extraction and selection, data fusion, and overall classification with increased reliability and dependability.

II. Face

Biometric Space

The (biometrics) face processing space can be conceptualized as an n-D space with its axes indexing variability along dimensions that are related to the data capture conditions encountered during enrollment (training) and testing. The axes of variability describe the geometry used during image acquisition. Examples include, but are not limited to, pose, illumination, and expression (PIE); motion and/or temporal change; and the impact of un-cooperative subjects (e.g., impostors). Occlusion and disguise, or equivalently, denial and deception, represent major challenges yet to be addressed.

Face biometrics cannot continue to assume that the personal signatures used for face authentication are complete, constant, and time-invariant. Most clients are indeed legitimate and honest. They have nothing to hide, and have all the incentives to cooperate. The very purpose of biometrics, however, is to provide security from impostors seeking to breach security and/or from uncooperative subjects. Therefore, the overall challenge for biometrics is (1) to expand the scope and utility of authentication engines by gradually removing unwarranted assumptions on the completeness and qualities of the biometric data captured, and (2) to expand the scope and functionality of the biometric processing space.

Recent evaluations of face recognition techniques for applications to Facebook cast further doubt that the face recognition problem is about to be solved and ready for full fledged deployment. The best performance reported by the above study for 60,000 faces representing merely 500 users is only ~65% using SVM. This report is quite different from the high 90% performance accuracy usually reported for large evaluations, such as FRGC. The standard explanation provided for such discrepancies is the lack of appropriate databases for both training and testing vis-à-vis novelty and variability. Ponce et al. (2006) among others have raised dataset concerns in object recognition vis-à-vis currently available image collections (e.g., Caltech 4 and Caltech 101). Some of the shortcomings mention that "the viewpoints and orientations of different instances in each category seem to be similar; their sizes and image positions are normalized (e.g., the objects of interest take up most of the image and are approximately centered in Caltech 101); there is only one instance of an object per image; finally, there is little or no occlusion and background clutter." Furthermore, the problems with such restrictions are two fold. One, some algorithms may exploit them (e.g., near-global descriptors with no scale or rotation invariance may perform well on such images), but fail when restrictions do not apply. Two, the images are not sufficiently challenging for the benefit of more sophisticated algorithms (e.g., scale invariance) to make a difference.

The boosting approach proposed here expands the biometric processing space. It allows for open set recognition with the inclusion of a reject option for unknown (not enrolled) probes (e.g., impostors). It also handles occlusion and disguise with the option to rank features and/or components in terms of their power of discrimination.

Biometric systems need to combine science, technology, and engineering. The science references modeling and prediction. The technology is generally responsible for mapping the science into algorithms. The engineering should be concerned with deploying full-fledged (authentication and surveillance) systems that can cope with an expanded biometric space and its adversarial (data capture) conditions. In the end, biometrics practice is about corpus, engineering, and evaluation.

III. Natural Bases and Face Space

Human faces have to be represented before recognition can take place. The role played by representation is most important, and it probably exceeds that played by recognition. The representations, learned through visual experience, are often context and task driven. The process responsible is conceptually similar to neural Darwinism. Non-accidental properties (also referred to as "features") that emerge to represent human faces become the particular dimensions the human face representations encode. The features correspond to coordinate axes and define the face space as one among several bases for natural images. The same features can also support classification when boosting employs them as "stump functions" or "weak learners".

Neural Darwinism is discriminative and selective rather than descriptive and instructive. It corresponds to closed loop systems where behavior is driven by performance as it is the case with boosting. Features are proposed (i.e., "extracted") and kept (i.e., "selected") according to their utility in recognition. Evolutionary computation has been used to develop a dictionary of appearance-based features to define the face space.

The basis functions, similar in concept to receptive field (RF) profiles, are the dimensions that define the face space. The raw face data, functionally projected along the basis functions, yields features suitable to encode the face. The face space can be learned and fixed ahead of time to encode human faces during enrollment and testing. This learning and fixation can provide for efficiency, on one side, and consistent operation and meaningful evaluations, on the other side.

The novel two-stage approach described here is characteristic of hybrid methods. The approach combines appearance (PCA or PCA+LDA) and holistic anthropometrics that include Head (H), Face (F), and Shoulder (S) linear and non-linear geometric measurements. The holistic appearance coefficients and anthropometric measurements constitute the feature vectors used for hybrid decision level fusion classification. Boosting, an alternative method, ranks the above features as "weak learners" and combines their outputs to build "strong" classifiers using feature level fusion.

The motivation and novelty of this approach comes from the realization that faces (and thus identities) are authenticated not in isolation (cropped and boxed) but rather as meaningful components of the head—face—neck—shoulders configuration. This aspect can be viewed as a straightforward extension of soft biometrics, which takes advantage of complementary information to facilitate and enhance face recognition. First there is information, sometimes even carried on travel or identity documents, which records human characteristics that can distinguish between people. Examples include simple traits such as age, height and weight, eye color, hair color and texture, skin tone and color, body frame, scars and blemishes, and the list goes on. Additional soft biometrics related to demographics, e.g., ethnicity and gender, can be automatically determined using categorization. Context and behavior are also strong clues that can alter the confidence in what the face recognition engines have determined based solely on physical appearance and soft biometrics. They help to filter out and/or counter denial and deception using augmented cognition, which is the equivalent of a "sixth" sense that gets fused with the data sensed and the soft biometrics.

The appearance ("eigen") coefficients and anthropometric measurements selected may be used as feature vectors. A boosting algorithm ranks features as "weak learners" and combines their outputs for "strong" recognition. A novelty of the holistic anthropometric approach comes from its use of geometric measurements across the head and shoulders (below the neck) in addition to the face.

IV. Feed-Forward Architectures

Image ("face") parsing and interpretation are incremental and progressive in scope. This process takes place using feed-forward architectures with ever increasing fields of view (FOV). Evidence accumulation involves a steady progression in the way the visual information is processed and analyzed. The competitive and hierarchical aspect of feed-forward architectures can be traced back to the Neocognitron. The concern here is to extract and rank relatively high level features just before the decision-making classification stage of face authentication. Towards that end discriminative methods that aggregate local and distributed ("shared") visual contents may be employed.

A. Discriminative Methods

Contrary to the known methods, the present invention incorporates a unified approach that covers image representation, matching, and categorization using data fusion.

Progressive processing, evidence accumulation, and fast decisions are the hallmarks for discriminative methods. Generally, it is not desirable to have expensive density estimation, marginalization, and synthesis characteristic of generative methods. Formally, it is known that pattern classification can be approached from at least two points of view. One view can be informative (also referred to as generative). Here, the classifier learns class densities (e.g., HMM). Another view can be discriminative. Here, the goal is learning class boundaries without regard to underlying class densities (e.g., logistic regression, neural networks, etc.). Overall, discriminative methods focus on estimating the posteriors in a fashion similar to the use of the likelihood ratio.

The terms "feature" and "component" are interchangeable in meaning and are used throughout this disclosure.

B. Boosting

The basic assumption behind boosting is that "weak" learners can be combined to learn any target concept with probability $1-\eta$. Weak learners are usually built around simple features (or components) as stump functions that classify at better than chance (with probability $\frac{1}{2}+\eta$ for $\eta>0$). Towards that end, adaptive boosting (AdaBoost) can be used in conjunction with the classification to improve performance.

AdaBoost adaptively and progressively resamples data to focus learning with the relative weights of misclassified samples that increase after each iteration. AdaBoost involves choosing T effective features $h_t$, that serve as weak (learners) classifiers and using them to construct separating hyperplanes. AdaBoost implements margin optimization with the margin viewed as a measure of confidence or predictive ability. Furthermore, AdaBoost minimizes (using greedy optimization) some risk functional whose minimum corresponds to logistic regression. AdaBoost converges to the posterior distribution of (the labels) y conditioned on (data) x, with the strong but greedy classifier H becoming in the limit the log-likelihood ratio test. The multi-class extensions for AdaBoost are AdaBoost.M1 and .M2 with the latter focused now on both difficult data samples to recognize and labels hard to discriminate.

C. Anthropometric and Appearance-Based Representation

The present invention's hybrid methodology is a hybrid of two approaches:

appearance-based and anthropometric-based recognition. For appearance-based recognition, the present invention employs two types of face spaces: PCA (eigenfaces) and PCA+LDA (Fisherfaces) including dimensionality reduction using energy-cutoff criteria. The training (enrolled) images are pre-processed using histogram normalization, geometric normalization using the eye coordinate, and cropping the face images using an elliptical mask. The Euclidean distance computes the similarity between gallery and query images for the purpose of authentication.

Anthropometric-based recognition includes the extraction of geometric features and their iterative ranking and selection for the purpose of dimensionality reduction. The novelty of this approach is the use of geometric measurements that cover head and shoulders (below the neck) in addition to the face.

Two types of data fusion for the purpose of human authentication operate on the representations derived, namely, decision level fusion and feature-level fusion. For the decision-level fusion method, the similarity Euclidean scores obtained using both appearance-based and anthropometric-based approaches are fed to connectionist ("neural networks") training to estimate their relative combination weights. The feature-level fusion methodology considers eigen coefficients and anthropometric measurements as "weak learners" (stump) features. Furthermore, it employs boosting to select the most significant features among them for assembly into strong classifiers. Eigen coefficients are obtained from PCA using energy cutoff criteria. The nearest neighbor classifier scores the relative merits of weak learners for boosting.

1. Anthropometric-Based Features

Figure 7:
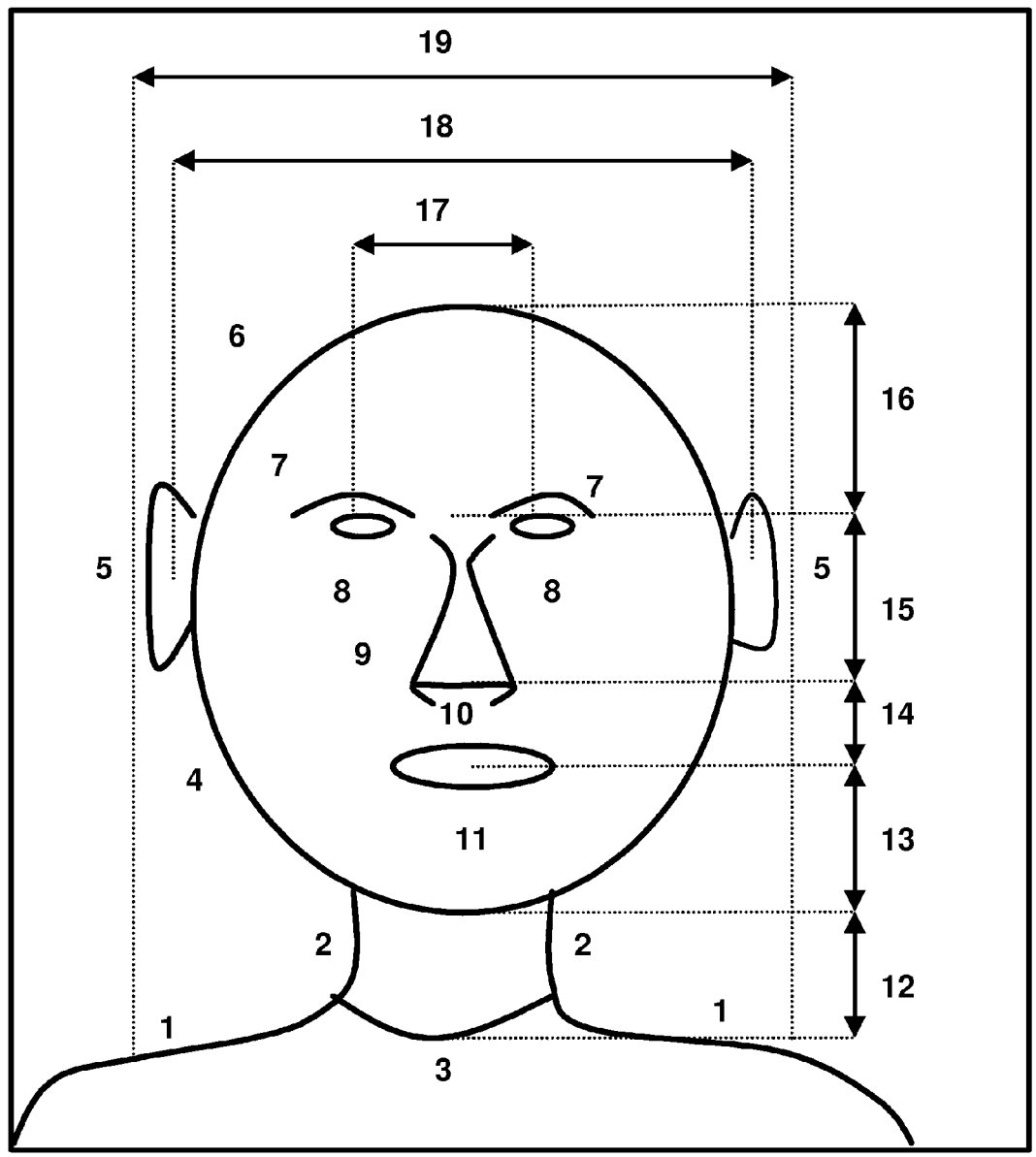
FIG. 7 shows an example of holistic anthropometric features.

Previous research using anthropometric-based recognition had access only to face features and evaluated their utility on "clean" images without occlusion or disguise. As a new element, the present invention assesses the utility of anthropometric-based geometrical features on face images adversely affected by occlusion and/or disguise. Similar to soft biometrics, the present invention traditional head and face features measurements, together with novel features below the face, which correspond to neck and shoulders, for the purpose of reliable ID authentication. The resulting holistic (head-face-neck-shoulders) anthropometric features extracted are shown in FIG. 7. They include 19 geometric features whose description is shown in TABLE 1.

TABLE 1

Ranking of Holistic Anthropometric Features

| Feature# (type) | Description | Feature Rank |
|---|---|---|
| 1 | Length from shoulder to neck (average of left and right side) | 12 |
| 2 | Length from neck to chin (average of left and right side) | 1 |
| 3 | Frontal half of neck circumference | 5 |
| 4 | Length of face (lower half) | 9 |
| 5 | Length of ear lobe (average of left and right side) | 4 |
| 6 | Length of face (upper half) | 8 |
| 7 | Length of eye brow (average of left and right) | 3 |
| 8 | Outer circumference of eye (average of left and right eyes) | 13 |
| 9 | Length of nose (average of left and right half) | 2 |
| 10 | Circumference of nose - lower part | 17 |
| 11 | Circumference of mouth | 7 |
| 12 | Distance from neck to chin (mid point) | 19 |
| 13 | Distance from chin to mouth (mid point) | 10 |
| 14 | Distance from mouth to nose bottom tip | 14 |
| 15 | Distance from nose bottom tip to lower fore head | 16 |
| 16 | Distance from lower forehead to hair line | 18 |

TABLE 1-continued

Ranking of Holistic Anthropometric Features

| Feature# (type) | Description | Feature Rank |
|---|---|---|
| 17 | Inter eye distance | 6 |
| 18 | Inter ear distance | 15 |
| 19 | Inter mid shoulder distance | 11 |

Extracted features include, but are not limited to, horizontal and vertical distances; linear and non-linear (curves) measurements; and head, face, neck, and shoulder measurements. Matlab's getpts function may be used to capture coordinates. The Euclidean distance may then be computed between different pairs of points. The anthropometric feature set may also include several non-linear measurements, such as curve (arc) lengths. To measure the length of a curve, Matlab's spline tool box may be used to fit a smooth spline curve. The resulting curve length may then be derived. The feature set may include curves related to the eyes, mouth, shoulder, neck, etc. The linear measurements may include inter-eye distance, inter-shoulder distance, mid point of mouth to mid point of nose, etc.

2. Appearance-Based Feature Extraction and Selection

Eigenfaces and Fisherfaces are the two main appearance-based face recognition methods. Eigenfaces are derived using Principal Component Analysis (PCA). They map the original high-dimensional raw face space into a lower uncorrelated dimensional face space. Fisherfaces are derived using a combination of PCA (for dimensionality reduction) and Linear Discriminant Analysis (LDA) for better class separation. PCA, LDA, and PCA+LDA algorithms have been widely employed for face recognition to show superior performance on face images without occlusion and disguise. The present invention's objective is to assess their performance using degraded face images due to occlusion or disguise and to suggest specific enhancements for enhanced performance. The face identification evaluation system developed by Colorado State University (CSU) is used to evaluate the performance for both PCA and PCA+LDA algorithms. One benchmark can be obtained when one follows the CSU recommendation to use 60% of eigenfaces and Fisherfaces coefficients for recognition. For 200 images, such usage amounts to about 120-dimensional (face space) basis. As an embodiment, coefficients are selected based on the energy cut-off criteria. This selection may correspond to choosing 18 eigenfaces coefficients for the 90% energy cut-off.

3. Anthropometric Feature Selection

Feature selection is the process of identifying and removing irrelevant and/or redundant attributes from the data set. This process results in dimensionality reduction, which helps to improve the recognition rate and minimizes computational resources during both training and testing. There are two main categories of feature selection: filter-based and wrapper-based. The filter-based approach is based on the characteristics of the data rather than those of the learning algorithm. The wrapper-based method finds features that work best with a particular learning algorithm.

Filter-based selection methods are generally faster and more efficient than wrapper-based methods. Nonlimiting criteria for features selection can be based on a ranking scheme using measures, such as the entropy, information gain, fisher score, and/or unbalanced correlation score. The filter-based feature selection approach is conceptually driven by the mutual information between data and its label.

The realization used in the present invention to implement the filter-based approach is the correlation-based feature selection (CFS). The CFS algorithm is based on a heuristic that "good feature subsets contain features highly correlated with the class, yet uncorrelated with each other." The algorithm computes the following heuristic fitness to select a subset of features $$\text{MERIT}(FS) = \frac{N \times \overline{corr(F,C)}}{\sqrt{N + N(N-1) \times \overline{corr(F,F)}}} \quad (1)$$

where F is the feature, C is the class, N is the total number of features, $\overline{corr(F,C)}$ is the average of feature-class correlation, and $\overline{corr(F,F)}$ is the average of feature-feature correlation.

As an example, the following embodiment may be performed. The forward selection search algorithm may be used to search the feature space. The normalized fitness ranges from 0 to 1. To perform feature selection, 19 anthropometric features (listed in TABLE 1 may be extracted from the AR image face database and the Essex DB. Anthropometric features may be extracted from 90 clean images that include head (H), face (F) and shoulder (S). WEKA machine learning software may be used to perform feature ranking and selection. The CFS algorithm in WEKA software may run on the data set starting with an empty feature subset. The algorithm may employ the forward search selection algorithm to generate the top ranked feature subset. The exemplified ranking of individual features after running the feature selection algorithm is listed in the third column of TABLE 1. In this example, the merit of the best feature subset obtained using equation 1 (upon convergence) is 0.83. Four of the features selected (about a third of the features selected) include shoulder and neck measurements. Features that cannot be localized due to occlusion and/or disguise have their weight proportionally redistributed among the features that can be detected during human authentication.

D. Decision-Making Using Neural Networks and Boosting

Once holistic appearance-based and anthropometric-based representations have been derived and their dimensionality reduced, matching and decision-making can take place. Towards that end, similarity distances and decision-making methods are proposed. Decision-level fusion using neural networks and feature-level fusion using boosting are the specific decision-making methods proposed.

1. Decision-Level Fusion Using Neural Networks

The standard Euclidean distance may be used as the similarity measure S for both appearance-based and anthropometric-based methods to find the closest match in the gallery for a given probe image. Similarity scores may be obtained by using PCA, Fisherfaces (PCA+LDA), and anthropometric methods independently. Decision level fusion may be used to evaluate the performance of appearance-based method and anthropometric-based methods using the features selected earlier. A weighted fusion scheme may be used with the combination weights obtained by training an Artificial Neural Network (ANN). Assuming that $S_{PCA}$, $S_{(PCA+LDA)}$, and $S_{GEO}$ are the similarity score using PCA, PCA+LDA, and the anthropometric-based (geometric) method, respectively, and $W_{PCA}$, $W_{(PCA+LDA)}$, $W_{GEO}$ are the corresponding weights, the weighted hybrid similarity may be computed as follows:

$$S_{HYBRID} = W_{PCA} * S_{PCA} + W_{GEO} * S_{GEO} \quad (2)$$

$$S_{HYBRID} = W_{(PCA+LDA)} * S_{(PCA+LDA)} + W_{GEO} * S_{GEO} \quad (3).$$

A distinct data set (from those used for enrollment and testing) may be used to derive the weights. ANN training may take place using Matlab's Neural Network toolbox. As an example, the weights obtained may be $W_{PCA}=0.365$ ($W_{GEO}=0.635$) and $W_{(PCA+LDA)}=0.312$ ($W_{GEO}=0.688$).

2. Feature-Level Fusion Using Boosting

As an embodiment, to achieve boosting, the present invention makes use of Adaboost. Adaboost is an iterative and adaptive classification algorithm that aggregates a sequence of weak classifiers by updating the importance for the data points according to the errors encountered in previous iterations. In an exemplified embodiment, the present invention employs an Adaboost implementation that uses WEKA. The output for the algorithm may be a set of T features/weak classifiers after T rounds of boosting. Two sets of features may be employed for the boosting algorithm. These features are i) anthropometric features and ii) eigen coefficients. They may be obtained from the PCA algorithm using an energy cut-off criteria. Input to boosting comprises, as an example, holistic anthropometric features and 18 eigen (PCA) coefficients (for the 90% energy cut-off criteria). The top ranked 25 features selected by the boosting algorithm may be used for the recognition task. Since face recognition is a multi-class recognition identification problem, a majority voting strategy may combine all the pair-wise classification results. Thus, for example, a gallery of 30 individuals may require 435 pair wise comparisons under the present invention's hybrid-5 method.

3. Ranking of Features Using Boosting

Model-fitting has been coined as a sequential process of progressive refinement. This process generally begins by describing the largest and most striking aspects of a data structure. Thereafter, the process turns toward progressively smaller aspects of the data structure. This transition means that larger gains in classification predictive accuracy may be won using relatively simple models at the start of the process. In turn, potential gains may decrease in size as the modeling process continues. This functionality is what boosting is good at, parsimony and interpretability using ranking and aggregation.

To further evaluate the performance of boosting using transduction for open set face ID authentication under adverse image capture conditions, FRGC test images may be modified to simulate occlusion. A circle region with radius r is randomly chosen across the face image, the content of which is either set to zero or filled with random pixel values in [0, 255]. On average, the recognition rate, which tends to decrease as the radius of the occluded region increases, does not drop too much. The occluded regions may be randomly chosen and the performance observed can be very stable when the occluded regions are not too large.

Another experiment may consider the case where occluded regions are fixed (e.g., eyes, nose, mouth, etc.). Nose occlusion may affect performance more than the mouth and eyes. This distortion appears to be consistent with the relative distribution found for the face components' coefficients during boosting training. It also appears consistent with earlier findings regarding the importance of the nose for biometric authentication using asymmetric faces. The importance of the nose for Layer 2 categorization ("identification") vs. eyebrows importance (see below) for Layer 1 categorization ("detection") can be noticed. Face detection using boosting can confirm known psychophysical findings. For instance, one confirmed finding includes eyebrows being determined as the most important feature for face detection (as indicated in Layer 1 categorization: face vs. background using Caltech101 database) using boosting and transduction. The best weak learner corresponds to the part that yields the largest coefficient when boosting starts. The explanation for this finding is straightforward. The eyebrows may be highly discriminative due to (1) their emotive contents, (2) stability, (3) location above a convexity that makes them less susceptible to shadow, (4) illumination changes, and (5) displacement due to movement.

The ranking for the features ("weak learners") found by Hybrid-5 using boosting are as follows: length of eye brow (average of left and right); length from neck to chin (average of left and right side); eigen coefficient-2; eigen coefficient-4; length of nose (average of left and right half); length of ear lobe (average of left and right side); frontal half of neck circumference; eigen coefficient-5; circumference of mouth, length of face (lower part); eigen coefficent-7; inter eye distance; distance from chin to mouth (mid point); inter-ear distance; eigen coefficient-10; outer circumference of eye (average of left and right eyes); eigen coefficient-11; distance from mouth to nose bottom tip; length from shoulder to neck (average of left and right side); eigen coefficient-9; circumference of nose (lower part); eigen coefficient-13; eigen coefficient-17; eigen coefficient-12; eigen coefficient-18; and distance from lower forehead to hair line.

Ranking using boosting may be different from ranking of anthropometric features using similarity, as indicated in TABLE 1. Boosting using anthropometric and appearance-based features reconfirms the importance of the eyebrow for authentication and ranks it again as the top feature. The use of measurements outside the face (e.g., neck and shoulders) helps too. It can also be noted that the ranks for two "apparently" similar features, the length from neck to chin (average of left and right side) ("curve") and distance from chin to mouth (mid point) ("straight line") can be found by boosting quite differently at #2 and #12, respectively.

V. Experiments

A. Experimental Results

Part I

The first series of experiments Part I is mostly about feasibility, with large scale and diversity aspects deferred to a second series of experiments—Part II.

As an experimental example, two data sources are used. These data sources are the AR DB and the Essex DB. The AR face DB has over 4,000 color images (from approximately 126 subjects) with varying illumination, facial expressions and occlusions. The face recognition database from Essex has about 7,900 images (from approximately 395 subjects), which vary in terms of facial expressions, race, gender, lighting conditions, and facial hair. In addition, some of the individuals wore glasses. The present invention's experiments employ 3 types of face images from 30 subjects: clean, disguised, and occluded. From the two databases 90 clean face images may be chosen, 30 of which show a neutral expression, 30 of which show varying illumination, and 30 of which show varying facial expression. Ninety additional disguised images using artificially created beards may be generated using Adobe's Photoshop. Also, ninety additional occluded images may be created by masking half of the face in a clean face image again using Adobe's Photoshop. The available corpora thus may include 270 images (90 clean, 90 disguised, and 90 occluded) from 30 subjects. All the images used may belong to male subjects. These images may be used to create 3 distinct sets: ANN training, gallery, and probe sets, respectively. Two hundred additional images from the AR database may be used to generate the appearance-based face space. The Face Identification and Evaluation Software, developed by CSU, may be used to evaluate appearance-based method, PCA and PCA+LDA. To meet CSU software requirements, raw images from the AR database and JPEG images from the Essex database are converted to PGM format using, for instance, the ImageMagick library. All the images used for PCA and PCA+LDA experimental work are resized to 96×72 pixels in size. Finally, a five-step normalization using CSU software may be carried out for (i) converting 256 gray levels into floating points; (ii) geometric normalization that lines up the chosen eye coordinates; (iii) cropping the image using an elliptical mask; (iv) equalizing the histogram of the unmasked part of the image; and (v) normalizing the pixel values to mean zero and variance of one. PCA basis eigenvectors may be computed using 200 images from the AR. The final base retained (for building biometric signatures) may be spanned using a reduced 120-dimensional PCA subspace.

The Euclidean distance and nearest neighbor classifier may be used for authentication and matching. The embodied experiments conducted are of the following type:

Simple-1) appearance-based recognition using PCA+LDA utilizing top 60% eigen vectors;
Simple-2) appearance-based recognition using PCA+LDA with 90% energy PCA cut-off;
Simple-3) appearance-based recognition using PCA using top 60% eigen vectors; Simple-4) appearance-based recognition using PCA with 90% energy PCA cut-off; Hybrid-1) hybrid ANN recognition using PCA+LDA and anthropometric features from face only; Hybrid-2) hybrid ANN recognition using PCA+LDA and anthropometric features from face, head and shoulders (holistic); Hybrid-3) hybrid ANN recognition using PCA and anthropometric features from face only; Hybrid-4) hybrid ANN recognition using PCA and anthropometric features from face, head and shoulders (holistic); and, Hybrid-5) hybrid recognition using eigen (PCA) coefficients and anthropometric features using boosting.

Hybrid methods 1 and 3 use 9 anthropometric features from face only while hybrid methods 2 and 4 use 13 anthropometric features. The performance for the hybrid methods 1, 2, 3, and, 4 is obtained using the combination weights derived earlier. Feature level fusion using all the 19 anthropometric features and eigen coefficients (subject to 90% energy PCA cut-off) are fed to the hybrid "boosting" method 5. The top ranked 25 features are used to build the strong boosting classifier.

Embodied experiments were conducted for 2 data combinations: gallery (clean)/probe (occluded) and gallery (clean)/probe (disguised). Embodied experiments were also conducted on PCA and PCA+LDA using clean images for both gallery and probes to establish "clean" benchmarks against disguised/occluded biometric conditions.

Results from embodied experiments showed that PCA consistently performed better than Fisherfaces, both on its own and as part of hybrid methods. For clarity purposes, FIG. 8, FIG. 9, TABLE 2 and TABLE 3 therefore omit the results obtained using Fisherfaces. Experimental results tabulate the recognition rates for disguised and occluded biometric conditions in TABLE 2 and TABLE 3, respectively.

TABLE 1

Recognition (Hit) Rates for Disguised (Face With Beard) Images

Recognition (Hit) Rates

| FAR | Simple-1 PCA + LDA (top 60%) | Simple-2 (PCA + LDA)_E (90% energy) | Simple-3 PCA (top 60%) | Simple-4 (PCA)_E (90% energy) | Hybrid-1 (PCA + LDA)_E + Anth_Face | Hybrid-2 (PCA + LDA)_E + Anth_Holistic | Hybrid-3 PCA_E + Anth_Face | Hybrid-4 PCA_E + Anth_Holistic | Hybrid-5 Boosting |
|---|---|---|---|---|---|---|---|---|---|
| 0.05 | 0.2 | 0.3 | 0.3 | 0.41 | 0.4 | 0.42 | 0.51 | 0.52 | 0.58 |
| 0.1 | 0.53 | 0.56 | 0.56 | 0.57 | 0.65 | 0.664 | 0.68 | 0.7 | 0.76 |
| 0.15 | 0.64 | 0.65 | 0.65 | 0.67 | 0.71 | 0.73 | 0.73 | 0.77 | 0.79 |
| 0.2 | 0.64 | 0.65 | 0.66 | 0.67 | 0.72 | 0.75 | 0.73 | 0.77 | 0.79 |

TABLE 3

Recognition Rates For Occluded (Half-Face) Images

Recognition (Hit) Rates

| FAR | Simple-1 PCA + LDA (top 60%) | Simple-2 (PCA + LDA)_E (90% energy) | Simple-3 PCA (top 60%) | Simple-4 (PCA)_E (90% energy) | Hybrid-1 (PCA + LDA)_E + Anth_Face | Hybrid-2 (PCA + LDA)_E + Anth_Holistic | Hybrid-3 PCA_E + Anth_Face | Hybrid-4 PCA_E + Anth_Holistic | Hybrid-5 Boosting |
|---|---|---|---|---|---|---|---|---|---|
| 0.05 | 0.1 | 0.2 | 0.2 | 0.31 | 0.31 | 0.32 | 0.41 | 0.43 | 0.49 |
| 0.1 | 0.21 | 0.31 | 0.26 | 0.32 | 0.39 | 0.41 | 0.46 | 0.48 | 0.56 |
| 0.15 | 0.31 | 0.32 | 0.33 | 0.39 | 0.47 | 0.49 | 0.50 | 0.52 | 0.58 |
| 0.2 | 0.42 | 0.43 | 0.44 | 0.45 | 0.515 | 0.53 | 0.53 | 0.56 | 0.61 |

Figure 8:
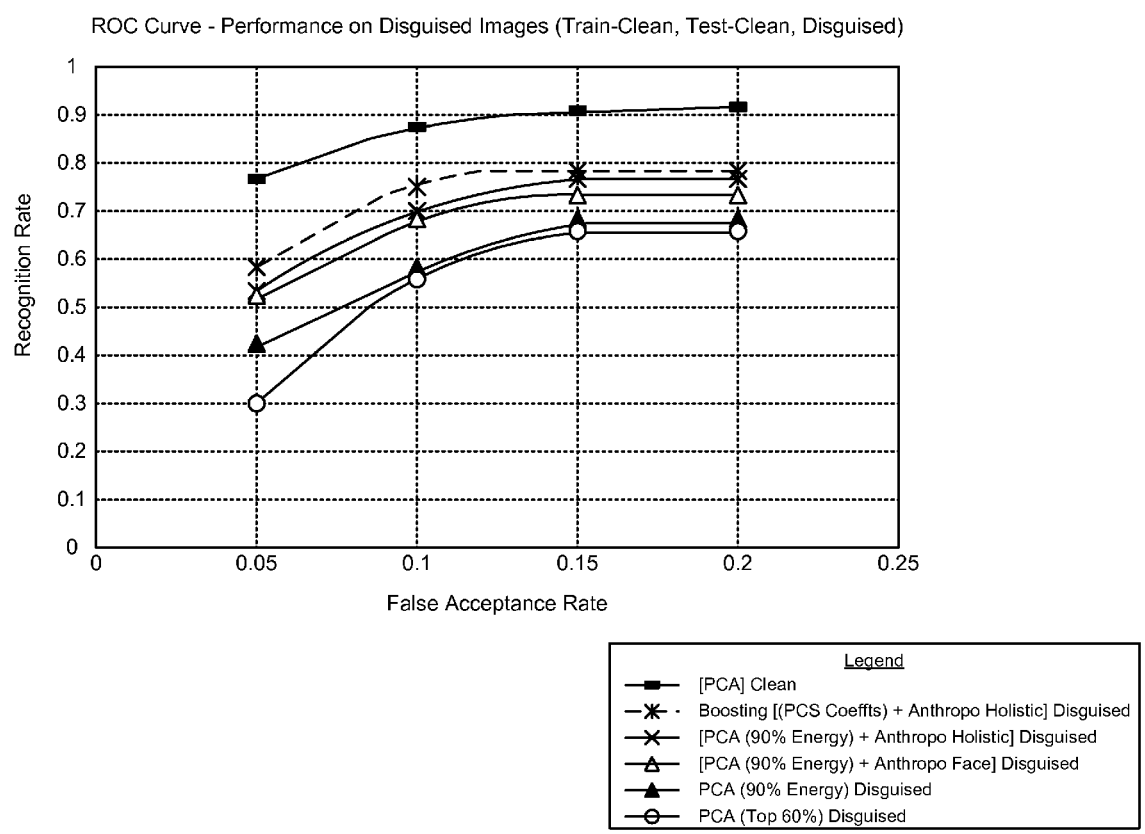
FIG. 8 shows an example of an ROC for disguised images.
Figure 9:
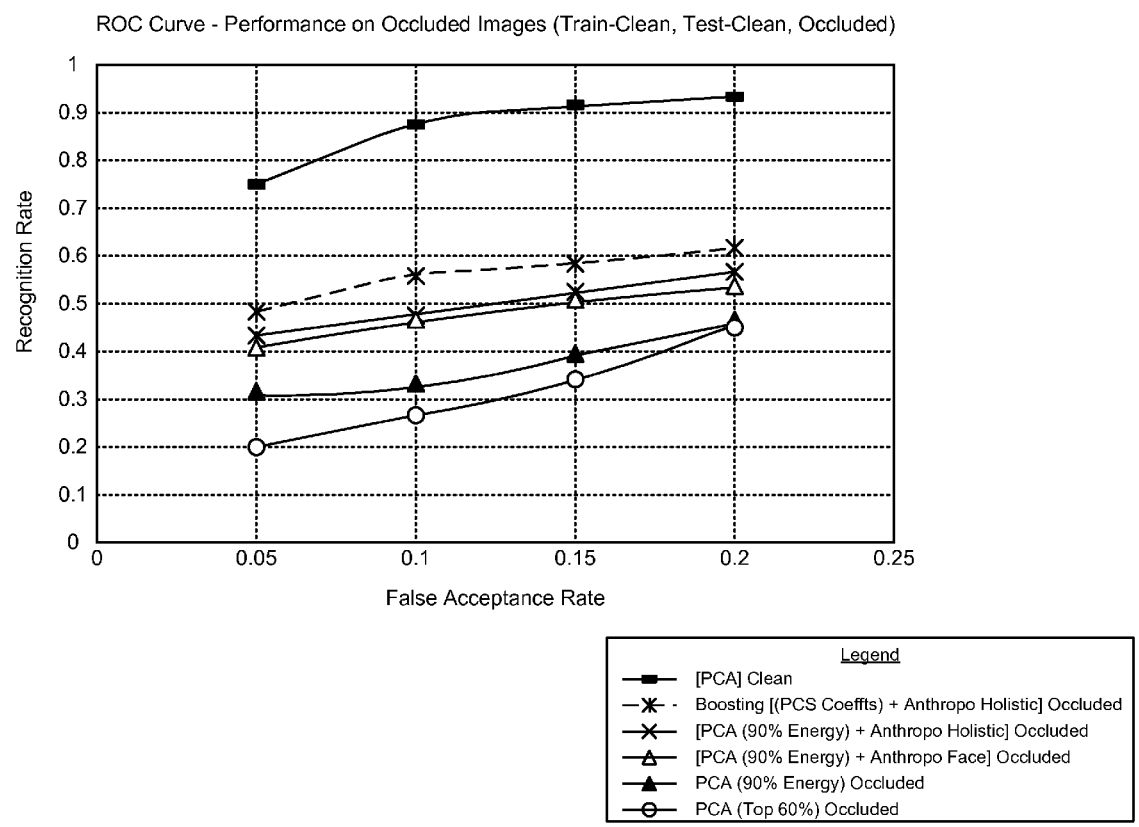
FIG. 9 shows an example of an ROC for occluded images.

Receiver Operating Characteristic (ROC) curves may be generated to show the performance for some of the methods used. In particular, the ROCs shown are based on PCA with top 60% eigen vectors (Simple-3); PCA with energy cut-off (Simple-4); PCA+Anthropometric Face (Hybrid-3); PCA+Anthropometric Holistic (Hybrid-4); and PCA+Anthropometric using boosting (Hybrid-5). The ROC curves are shown in FIG. 8 for disguised (with beard) images and in FIG. 9 for occluded (half-face) images. For comparison purposes, the performance of PCA on clean face images is also shown in FIG. 8 and FIG. 9. The results show that disguise and occlusion lead to a significant deterioration in performance for both PCA and PCA+LDA. ROC results also show that the proposed hybrid methods significantly improve the performance of PCA and PCA+LDA methods both on disguised and occluded images. It can be noted that the appearance-based recognition PCA outperforms PCA+LDA. Among the appearance-based recognition approaches, those utilizing the 90% energy PCA cut-off criteria yield better performance as compared to those using the top 60% eigen vectors as suggested by CSU. Hybrid methods using holistic anthropometric (below the neck) features outperform hybrid methods that employ face measurements only. These results conclude that the use of features below the face enhances the recognition performance. The hybrid-5 method, which employs the top 25 features found by boosting, is the top performer with accuracies of 76% and 56% for disguised and occluded images, respectively, at FAR=10%. The experiments conducted showed a higher improvement rate for occluded images compared to disguised images (because occlusion is localized compared to disguise). The performance reported surpasses that obtained using the worst performer Fisherfaces (as seen in TABLE 4) for disguised and occluded images, and is similar to recent (and realistic) results obtained on Facebook (on clean data). Another that can be observation made is that performance for human authentication rate may saturate at FAR=0.1.

TABLE 4

Improvement in Recognition Rates Of Hybrid Methods for Disguised And Occluded Images % Improvement in Recognition Rate Compared to PCA + LDA

| | Disguised Images | | | | | Occluded Images | | | | |
|---|---|---|---|---|---|---|---|---|---|---|
| FAR | Hybrid-1 | Hybrid-2 | Hybrid-3 | Hybrid-4 | Hybrid-5 | Hybrid-1 | Hybrid-2 | Hybrid-3 | Hybrid-4 | Hybrid-5 |
| 0.05 | 100.0 | 110.0 | 155.0 | 160.0 | 190.0 | 210.0 | 220.0 | 310.0 | 330.0 | 390.0 |
| 0.1 | 22.6 | 25.3 | 28.3 | 32.1 | 43.4 | 85.7 | 95.2 | 119.0 | 128.6 | 166.7 |
| 0.15 | 10.9 | 14.1 | 14.1 | 20.3 | 23.4 | 51.6 | 58.1 | 61.3 | 67.7 | 87.1 |
| 0.2 | 12.5 | 17.2 | 14.1 | 20.3 | 23.4 | 22.6 | 26.2 | 26.2 | 33.3 | 54.2 |

The results reported confirm that performance on an expanded biometric space is still lacking, and that the methods proposed by the present invention can enhance performance to a significant degree.

B. Experimental Results

Part II

Figure 10:
FIG. 10 shows examples of images (clean and occluded) from AR face database.
Figure 10:
Figure 10:
Figure 11:
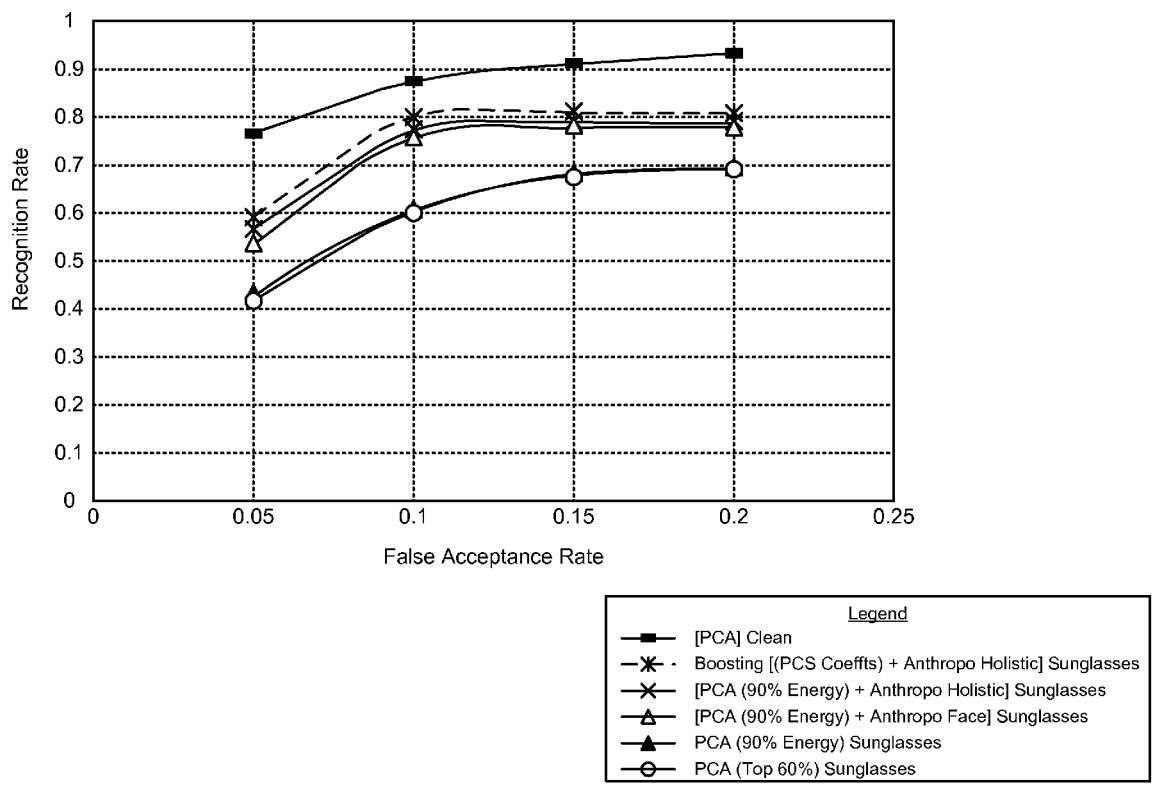
FIG. 11 shows an example of an ROC curve for occluded (sunglasses) images.
Figure 12:
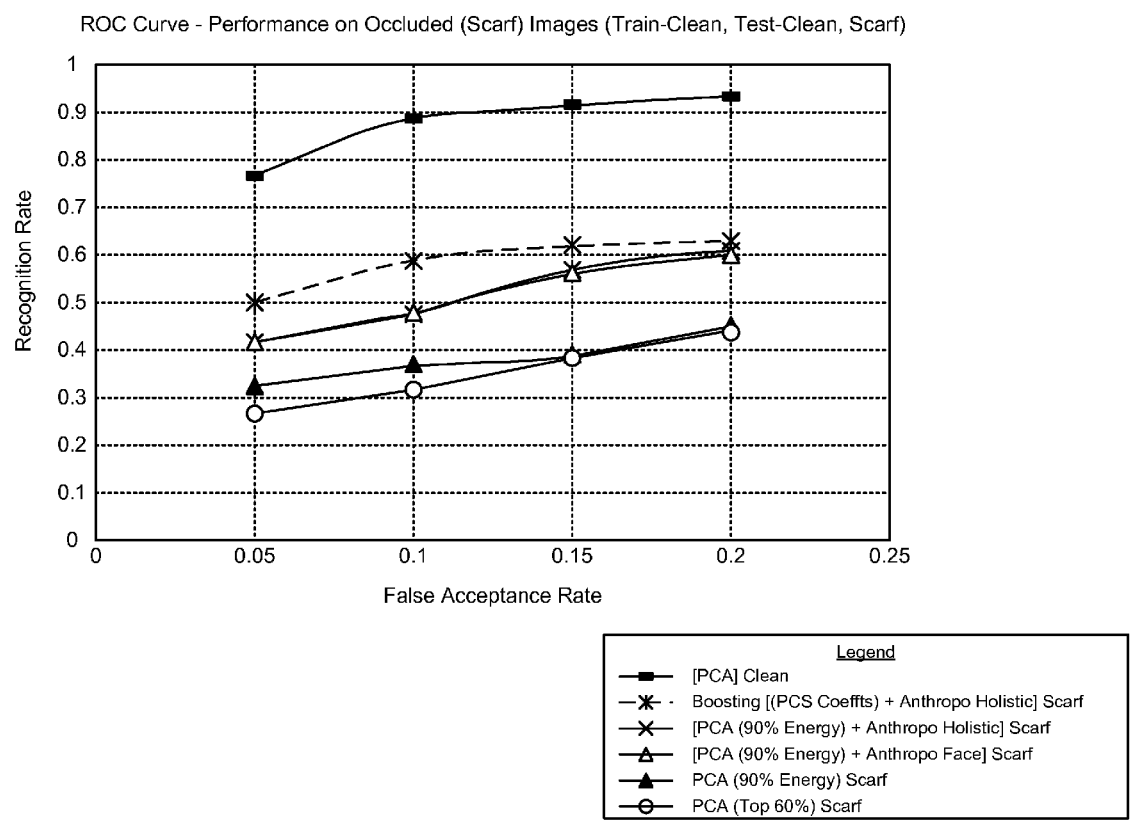
FIG. 12 shows an example of an ROC curve for occluded (scarf) images.
Figure 13:
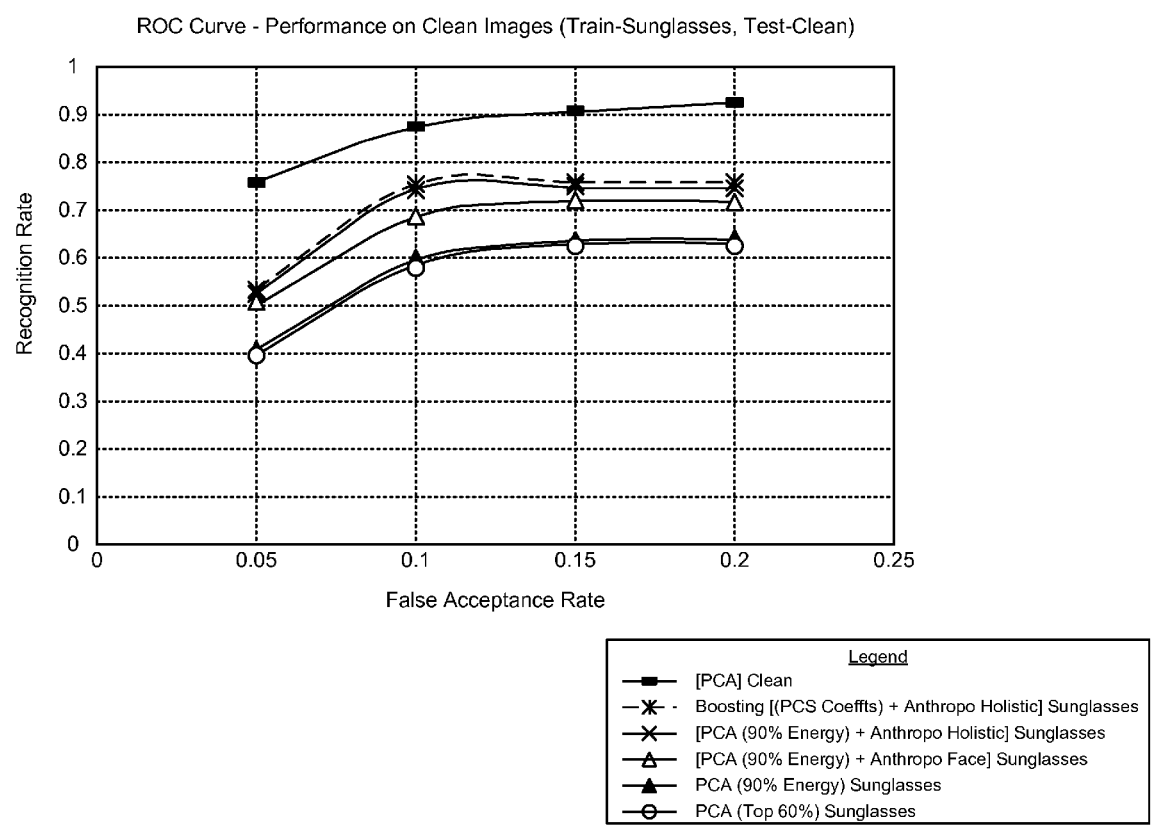
FIG. 13 shows an example of an ROC for clean (sunglasses) images.
Figure 14:
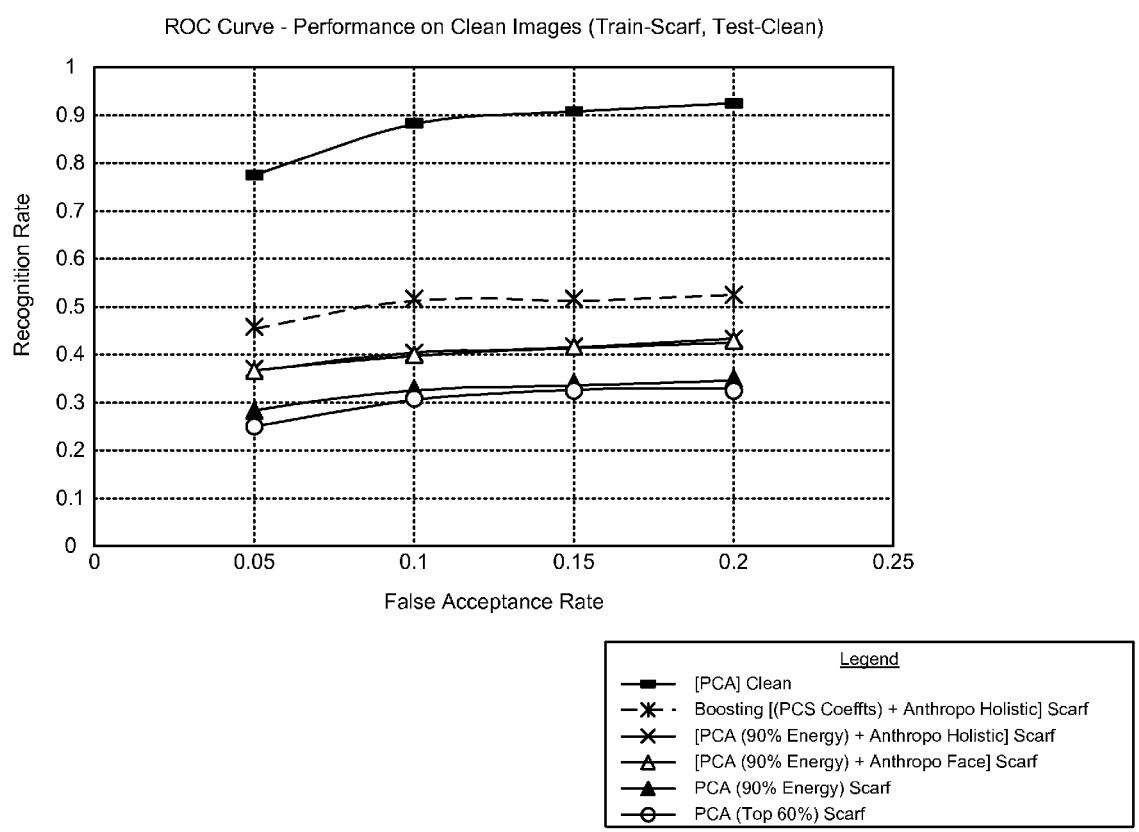
FIG. 14 shows an example of an ROC for clean (scarf) images.

The second series of experiments (Part II) aim to show that feasibility, robustness, and utility for our proposed methods cover additional degrees of freedom: (a) face space derived using FERET while training (enrollment) and testing take place on another database AR using naturally (scarves and glasses) occluded images (see FIG. 10); (b) large scale aspects and diversity, with AR gallery now consisting of 100 subjects, while gender diversity covers 60 males and 40 females; and (c) expanded functionality to allow enrollment of occluded faces with testing taking place on clean faces. The experiments described here have access to two data sources, the grayscale FERET database and the AR database. The FERET database contains about 15,000 images with varying facial expression, illuminations and side poses, while the AR database contains over 4,000 images. The datasets used for conducting experiments are summarized in TABLE 5.

TABLE 5

Datasets for Experiments - Part II

| Data Source | Number of Images Used | Number of Subjects | Details | Purpose |
|---|---|---|---|---|
| FERET | 2,000 | 1,000 | fa (regular facial expression) & fb (alternate facial expression) frontal images | Derive eigenspace & Fisher space |
| AR | 2,000 | 100 | 20 (8 clean + 6 sunglasses + 6 scarf) images per subject 60 men and 60 women | train/test train clean (800 images)/ test sunglasses (600 images) train clean (800 images)/ test scarf (600 images) train sunglasses (600)/ test clean (800) train scarf (600)/ test clean (800) |

As before the 5-step normalization for face images may be performed using the CSU software. Experiments were conducted using top 60% eigenfaces, which resulted in 1200-D face space, and using 90% energy criteria which resulted in 45 eigenfaces. The anthropometric feature selection using these data sets resulted in the same ranking as tabulated in TABLE 1. The weights for the decision level fusion obtained from ANN were $W_{PCA}=0.42$ ($W_{GEO}=0.58$) and $W_{(PCA+LDA)}=0.39$ ($W_{GEO}=0.61$). For the boosting method, feature level fusion using all the 19 anthropometric features and 45 eigenfaces coefficients (subject to 90% energy PCA cutoff) were utilized. The top ranked 25 features were used to build the strong boosting classifier. Experiments were conducted both for the gallery (clean)/probe (occluded) and gallery (occluded)/ probe (clean) data combinations.

Results for the series of experiments—Part II are tabulated in TABLES 6-9 and the ROC curves are plotted in FIGS. 11-14.

TABLE 6

Recognition (Hit) Rates: Train (Clean)/Test (Occluded-Sunglasses) Images

Recognition (Hit) Rates

| FAR | Simple-1 PCA + LDA (top 60%) | Simple-2 (PCA + LDA)_E (90% energy) | Simple-3 PCA (top 60%) | Simple-4 (PCA)_E (90% energy) | Hybrid-1 (PCA + LDA)_E + Anth_Face | Hybrid-2 (PCA + LDA)_E + Anth_Holistic | Hybrid-3 PCA_E + Anth_Face | Hybrid-4 PCA_E + Anth_Holistic | Hybrid-5 Boosting |
|---|---|---|---|---|---|---|---|---|---|
| 0.05 | 0.41 | 0.41 | 0.42 | 0.42 | 0.47 | 0.49 | 0.53 | 0.56 | 0.59 |
| 0.1 | 0.58 | 0.59 | 0.60 | 0.61 | 0.70 | 0.73 | 0.76 | 0.77 | 0.80 |
| 0.15 | 0.65 | 0.65 | 0.68 | 0.68 | 0.72 | 0.76 | 0.78 | 0.79 | 0.81 |
| 0.2 | 0.65 | 0.65 | 0.69 | 0.69 | 0.72 | 0.76 | 0.78 | 0.79 | 0.81 |

TABLE 7

Recognition (Hit) Rates: Train (Clean)/Test (Occluded-Scarf) Images

Recognition (Hit) Rates

| FAR | Simple-1 PCA + LDA (top 60%) | Simple-2 (PCA + LDA)_E (90% energy) | Simple-3 PCA (top 60%) | Simple-4 (PCA)_E (90% energy) | Hybrid-1 (PCA + LDA)_E + Anth_Face | Hybrid-2 (PCA + LDA)_E + Anth_Holistic | Hybrid-3 PCA_E + Anth_Face | Hybrid-4 PCA_E + Anth_Holistic | Hybrid-5 Boosting |
|---|---|---|---|---|---|---|---|---|---|
| 0.05 | 0.25 | 0.26 | 0.27 | 0.33 | 0.41 | 0.41 | 0.42 | 0.42 | 0.50 |
| 0.1 | 0.31 | 0.31 | 0.32 | 0.37 | 0.46 | 0.465 | 0.48 | 0.48 | 0.59 |
| 0.15 | 0.36 | 0.38 | 0.385 | 0.39 | 0.52 | 0.53 | 0.56 | 0.57 | 0.62 |
| 0.2 | 0.43 | 0.43 | 0.44 | 0.45 | 0.59 | 0.59 | 0.60 | 0.61 | 0.63 |

TABLE 8

Recognition (Hit) Rates: Train (Occluded-Sunglasses)/Test (Clean) Images

Recognition (Hit) Rates

| FAR | Simple-1 PCA + LDA (top 60%) | Simple-2 (PCA + LDA)_E (90% energy) | Simple-3 PCA (top 60%) | Simple-4 (PCA)_E (90% energy) | Hybrid-1 (PCA + LDA)_E + Anth_Face | Hybrid-2 (PCA + LDA)_E + Anth_Holistic | Hybrid-3 PCA_E + Anth_Face | Hybrid-4 PCA_E + Anth_Holistic | Hybrid-5 Boosting |
|---|---|---|---|---|---|---|---|---|---|
| 0.05 | 0.39 | 0.40 | 0.40 | 0.41 | 0.44 | 0.48 | 0.50 | 0.53 | 0.54 |
| 0.1 | 0.56 | 0.58 | 0.59 | 0.60 | 0.65 | 0.68 | 0.69 | 0.75 | 0.76 |
| 0.15 | 0.62 | 0.62 | 0.63 | 0.64 | 0.70 | 0.71 | 0.72 | 0.75 | 0.76 |
| 0.2 | 0.62 | 0.63 | 0.63 | 0.64 | 0.70 | 0.71 | 0.72 | 0.75 | 0.76 |

TABLE 9

Recognition (Hit) Rates: Train (Occluded-Scarf)/Test (Clean) Images

Recognition (Hit) Rates

| FAR | Simple-1 PCA + LDA (top 60%) | Simple-2 (PCA + LDA)_E (90% energy) | Simple-3 PCA (top 60%) | Simple-4 (PCA)_E (90% energy) | Hybrid-1 (PCA + LDA)_E + Anth_Face | Hybrid-2 (PCA + LDA)_E + Anth_Holistic | Hybrid-3 PCA_E + Anth_Face | Hybrid-4 PCA_E + Anth_Holistic | Hybrid-5 Boosting |
|---|---|---|---|---|---|---|---|---|---|
| 0.05 | 0.21 | 0.22 | 0.24 | 0.28 | 0.29 | 0.35 | 0.36 | 0.36 | 0.45 |
| 0.1 | 0.28 | 0.29 | 0.30 | 0.32 | 0.34 | 0.38 | 0.39 | 0.40 | 0.51 |
| 0.15 | 0.30 | 0.30 | 0.32 | 0.33 | 0.35 | 0.39 | 0.41 | 0.41 | 0.51 |
| 0.2 | 0.30 | 0.30 | 0.32 | 0.34 | 0.35 | 0.39 | 0.42 | 0.43 | 0.52 |

As can be seen, the results show performance similar or better with that obtained in the earlier series of experiment—Part I. Holistic anthropometric yields better performance than face only anthropometric measures. The hybrid-5 boosting method yields the best performance overall. Recognition rate of 80% is obtained for the train (clean)/test (occluded with sunglasses) combination at FAR=10%. The new ranking of the features found by the boosting method is as follows: (again top ranked) length of eye brow (average of left and right), length from neck to chin (average of left and right side), eigen coefficient-1, eigen coefficient-3, eigen coeefficent-9, length of nose (average of left and right half), length of ear lobe (average of left and right side), eigen coefficient 6, frontal half of neck circumference, circumference of mouth, eigen coefficient 17, length of face (lower part), eigen coefficent-19, inter eye distance, distance from chin to mouth (mid point), eigen coefficient 23, inter ear distance, outer circumference of eye (average of left and right eyes), eigen coefficient-31, distance from mouth to nose bottom tip, length from shoulder to neck (average of left and right side), circumference of nose (lower part), eigen coefficient-14, eigen coefficient-21, distance from lower forehead to hair line. The observation made for series of experiments—Part I, that performance for face recognition rate saturates at FAR=0.1, holds true here too.

VI. Conclusions

The present invention introduces a novel approach for decision-level fusion using neural networks and feature-level fusion using boosting for the purpose of robust human authentication vis-à-vis face occlusion and disguise. Holistic anthropometric and appearance-based features feed the data fusion stage. In addition to standard head and face measurements, the holistic anthropometric features extract additional measurements below the face, which describe the neck and shoulders. The appearance-based features include standard PCA or Fisherfaces. Experimental data show the feasibility and utility of the proposed hybrid (extended geometry+appearance) approach for robust face recognition vis-à-vis degraded biometrics. The authentication results presented compare favorably against those obtained using both appearance-based methods and hybrid methods with anthropometric features confined to face and head. The proposed method can train on clean data and authenticate on corrupt data, or train on corrupt data and authenticate on clean data. Furthermore, the present invention is far simpler than Adaptive and Robust Correlation Filters (ARCF).

The foregoing descriptions of the embodiments of the present invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the present invention and its practical application to thereby enable others skilled in the art to best utilize it in various embodiments and with various modifications as are suited to the particular use contemplated without departing from the spirit and scope of the present invention. In fact, after reading the above description, it will be apparent to one skilled in the relevant art(s) how to implement the present invention in alternative embodiments. Thus, the present invention should not be limited by any of the above described example embodiments. For example, the present invention may be practiced over any object, such as airplanes, cars, trees, plants, pets, etc.

In addition, it should be understood that any figures, graphs, tables, examples, etc., which highlight the functionality and advantages of the present invention, are presented for example purposes only. The architecture of the disclosed is sufficiently flexible and configurable, such that it may be utilized in ways other than that shown. For example, the steps listed in any flowchart may be reordered or only optionally used in some embodiments.

In this specification, "a" and "an" and similar phrases are to be interpreted as "at least one" and "one or more."

Many of the elements described in the disclosed embodiments may be implemented as modules. A module is defined here as an isolatable element that performs a defined functions and has a defined interface to other elements. The modules described in this disclosure may be implemented in hardware, software, firmware, wetware (i.e. hardware with a biological element) or a combination thereof, all of which are behaviorally equivalent. For example, modules may be implemented as a software routine written in a computer language (such as C, C++, FORTRAN, Java, Basic, Malta or the like) or a modeling/simulation program such as SimuLink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

VII. References

B. J. Balas and P. Sinha (2006), Region-based representations for face recognition, ACM Transactions on Applied Perception, vol. 3, no. 4, 354-75.

H. B. Barlow (1989), Unsupervised learning, Neural Computation, vol. 1, 295-311.

B. C. Becker and E. G. Ortiz (2008), Evaluation of face recognition techniques for applications to Facebook, 8th Int. Conf. on Automated Face and Gesture Recognition (AFGR), Amsterdam, Holland.

A. J. Bell and T. J. Sejnowski (1995), An information maximization approach to blind separation and blind deconvolution, Neural Computation, vol. 7, 1129-59.

J. R. Beveridge et al. (2005), The CSU face identification evaluation system: Its purpose, features, and structure", Machine Vision and Applications, vol. 16, no. 2, 128-38.

O. Chapelle, B. Scholkopf, and A. Zien (2006) (eds.), Semi—Supervised Learning, MIT Press.

T. M. Cover and P. Hart (1967), Nearest neighbor pattern classification, IEEE Trans. on Info. Theory, vol. IT-13, 21-27.

I. J. Cox et al. (1996), Feature-based face recognition using mixture-distance, Computer Vision and Pattern Recognition (CVPR).

G. M. Edelman (1987), Neuronal Darwinism. The Theory of Neuronal Group Selection, Basic Books, NY.

Y. Freund and R. E. Shapire (1996), Experiments with a new boosting algorithm, 13th Int. Conf. on Machine Learning (ICML), 148-56, Bari, Italy.

K. Fukushima (1980). eocognitron: A self-organizing neural network model for a mechanism of attern recognition unaffected by shift in position, Biological Cybernetics, vol. 36, no. 4, 193-202.

S. Gutta and H. Wechsler (2004), Face recognition using asymmetric faces," 1st Int. Conf. on Biometric Authentication, Hong Kong, China.

M. A. Hall (1999), Correlation based feature selection for machine learning, PhD Thesis, University of Waikato, Hamilton.

P. J. B. Hancock, R. J. Baddeley, and L. S. Smith (1992), The principal components of natural images, Network: Computation in Neural Systems, vol. 3, 61-70.

D. J. Hand (2006), Classifier technology and the illusion of progress, Statistical Sciences, vol. 21, no. 1, 1-15.

S. S. Ho and H. Wechsler (2008), Query by transduction, IEEE Trans. on Pattern Analysis and Machine Intelligence, vol. 30, no. 9, 1557-71.

H. Lai, V. Ramanathan, and H. Wechsler (2008), Reliable face recognition using adaptive and Robust correlation filters, Computer Vision and Image Understanding, vol. 111, 329-50.

F. Li and H. Wechsler (2005), Open set face recognition using transduction, IEEE Trans. on Pattern Analysis and Machine Intelligence, vol. 27, no. 11, 1686-98.

F. Li and H. Wechsler (2009), Face authentication using recognition-by-parts, boosting, and transduction, Int. Journal of Pattern Recognition and Artificial Intelligence (to appear).

C. Liu and H. Wechsler (2000), Evolutionary pursuit and its application to face recognition, IEEE Trans. on Pattern Analysis and Machine Intelligence, vol. 22, no. 6, 570-82.

A. M. Martinez and R. Benavente (1998), AR Face Database, CVC TR#24, Purdue University.

J. Mutch and D. Lowe (2006), Multiclass object recognition using sparse, localized features, Computer Vision and Patter Recognition (CVPR), 11-18.

B. A. Olshausen and D. J. Field (1996), Emergence of simple cell receptive field properties by learning a sparse code for natural images, Nature, vol. 381, 607-09.

P. J. Phillips, P. J. Flynn, T. Scruggs, K. W. Bowyer, J. Chang, K. Hoffman, J. Marques, J. Min, and W. Worek (2005), Overview of the face recognition grand challenge, J. Mutch and D. Lowe (2006), Multiclass object recognition using sparse, localized features, Computer Vision and Patter Recognition (CVPR), New York, N.Y.

N. Pinto, J. J. DiCarlo, and D. D. Cox (2008), Establishing good benchmarks and baselines for face recognition, Workshop on Faces in 'Real-Life' Images (ECCV 2008), Marseille, France.

J. Ponce, T. L. Berg, M. Everingham, D. A. Forsyth, M. Hebert, S. Lazebnik, M. Marszalek, C. Schmid, B. C. Russell, A. Torralba, C. K. I. Williams, J. Zhang, and A. Zisserman (2006), Dataset issues in object recognition, in Toward Category-Level Object Recognition, Lecture Notes in Computer Science, J. Ponce, M. Hebert, C. Schmid, and A. Zisserman (eds.), Springer-Verlag.

Y. D. Rubinstein and T. Hastie (1997), Discriminative vs. informative learning, Knowledge and Data Discovery (KDD), 49-53.

D. L. Ruderman (1994), The statistics of natural images, Network, vol. 5, 517-48.

T. Serre et al. (2007), Robust object recognition with cortex-like mechanisms, IEEE Trans. on Pattern Analysis and Machine Intelligence, vol. 29, no. 3, 411-25.

J. Shi et al. (2006), How effective are landmarks and their geometry for face recognition?, Computer Vision and Image Understanding, vol. 102, 117-33.

P. Sinha et al. (2006), Face recognition by humans: Nineteen results all computer vision researchers should know about, Proc. IEEE, vol. 94, no. 11, 1948-62.

S. Thorpe, D. Fize, and C. Marlot (1996), Speed of processing in the human visual system, Nature, vol. 381, 520-22.

K. Tieu and P. Viola (2000), Boosting image retrieval, Computer Vision and Patter Recognition (CVPR), v. 1, 228-35.

K. Tsunoda, Y. Yamane, M. Nishizaki, and M. Tanifuji (2001), Complex objects are represented in macaque inferotemporal cortex by the combination of feature columns, Nature neuroscience, vol. 4, no. 8, 832-38.

V. Vapnik (1998), Statistical Learning Theory, Wiley.

V. Vapnik (2000), The Nature of Statistical Learning Theory, 2nd ed. Springer.

G. Wallis and H. H. Biilthoff (2001), Effects of temporal association on recognition memory, Proceedings of the National Academy of Sciences of the United States of America 98, 4800-04.

J. Weston et al. (2002), Feature selection and transduction for prediction of molecular bioactivity for drug design, Bioinformatics, Oxford University Press, vol. 1, no. 1.

What are claimed are:

1. A robust human authentication system for determining if at least one test image obtained using an imaging device matches at least one training image in an enrollment database comprising:
 a. feature extraction modules comprising:
   1) an appearance-based feature extraction module configured for extracting appearance-based features from the face of the test image;
   2) a holistic anthropometric feature extraction module configured for extracting holistic anthropometric features from the following elements from the test image:
     a) head;
     b) face;
     c) neck; and
     d) at least one shoulder;
 b. feature selector modules comprising:
   1) an appearance-based feature selector module configured for selecting the appearance-based features by using energy based cut-off criteria; and
   2) a holistic anthropometric feature selector module configured for selecting the holistic anthropometric features that are predictive of the identification of the test image; and
 c. at least one data fusion combiner module.

2. The robust human authentication system according to claim 1, wherein the holistic anthropometric feature selector module uses a filter-based feature selection approach.

3. The robust human authentication system according to claim 2, wherein the filter-based feature selection approach is driven by the mutual information between the test image's data and the test image's label.

4. The robust human authentication system according to claim 3, wherein the filter-based feature selection approach is implemented by correlation-based feature selection.

5. The robust human authentication system according to claim 1, wherein the data fusion combiner module is a decision-level neural network combiner module configured for combining the appearance-based features with the holistic anthropometric features using neural networks.

6. The robust human authentication system according to claim 1, wherein the data fusion combiner module is a feature-level boosting combiner module configured for combining the appearance-based features with the holistic anthropometric features using boosting.

7. The robust human authentication system according to claim 1, further including an authentication module, configured for matching and authenticating results from the data fusion combiner with the training image.

8. The robust human authentication system according to claim 1, further including a training image preprocessor module configured for preprocessing at least one training image by:
  a. converting 256 gray levels into floating points;
  b. using geometric normalization that lines up chosen eye coordinates;
  c. cropping the training image using an elliptical mask;
  d. equalizing a histogram of the training image; and
  e. normalizing pixel values to mean zero and variance of one.

9. A robust human authentication device for determining if at least one test image obtained using an imaging device matches at least one training image in an enrollment database comprising:
  a. feature extraction modules comprising:
    1) an appearance-based feature extraction module configured for extracting appearance-based features from the face of the test image;
    2) a holistic anthropometric feature extraction module configured for extracting holistic anthropometric features from the following elements from the test image:
      a) head;
      b) face;
      c) neck; and
      d) at least one shoulder;
  b. feature selector modules comprising:
    1) an appearance-based feature selector module configured for selecting the appearance-based features by using energy based cut-off criteria; and
    2) a holistic anthropometric feature selector module configured for selecting the holistic anthropometric features that are predictive of the identification of the test image; and
  c. at least one data fusion combiner module.

10. The robust human authentication device according to claim 9, wherein the holistic anthropometric feature selector module uses a filter-based feature selection approach.

11. The robust human authentication device according to claim 10, wherein the filter-based feature selection approach is driven by the mutual information between the test image's data and the test image's label.

12. The robust human authentication device according to claim 11, wherein the filter-based feature selection approach is implemented by correlation-based feature selection.

13. The robust human authentication device according to claim 9, wherein the data fusion combiner module is a decision-level neural network combiner module configured for combining the appearance-based features with the holistic anthropometric features using neural networks.

14. The robust human authentication device according to claim 9, wherein the data fusion combiner module is a feature-level boosting combiner module configured for combining the appearance-based features with the holistic anthropometric features using boosting.

15. The robust human authentication device according to claim 9, further including an authentication module, configured for matching and authenticating results from the data fusion combiner with the training image.

16. The robust human authentication device according to claim 9, further including a training image preprocessor module configured for preprocessing at least one training image by:
  a. converting 256 gray levels into floating points;
  b. using geometric normalization that lines up chosen eye coordinates;
  c. cropping the training image using an elliptical mask;
  d. equalizing a histogram of the training image; and
  e. normalizing pixel values to mean zero and variance of one.

17. A physical and tangible computer readable medium encoded with instructions for determining if at least one test image obtained using an imaging device matches at least one training image in an enrollment database, wherein execution of the instructions by one or more processors causes the one or more processors to perform the steps comprising:
  a. extracting
    1) appearance-based features from the face of the test image;
    2) holistic anthropometric features from the following elements from the test image:
      a) head;
      b) face;
      c) neck; and
      d) at least one shoulder;
  b. selecting
    1) the appearance-based features by using energy based cut-off criteria; and
    2) the holistic anthropometric features that are predictive of the identification of the test image by using a filter-based feature selection approach; and
  c. combining the appearance-based features with the holistic anthropometric features.

18. The physical and tangible computer readable medium according to claim 17, wherein the appearance-based features are combined with the holistic anthropometric features using neural networks.

19. The physical and tangible computer readable medium according to claim 17, wherein the appearance-based features are combined with the holistic anthropometric features using boosting.

20. The physical and tangible computer readable medium according to claim 17, further including matching and authenticating the results of combining the appearance-based features with the holistic anthropometric features, with the training image.

* * * * *